US011859024B2

United States Patent
Praetorius et al.

(10) Patent No.: US 11,859,024 B2
(45) Date of Patent: *Jan. 2, 2024

(54) DUAL CATALYST SYSTEM FOR PRODUCING POLYETHYLENE WITH LONG CHAIN BRANCHING FOR BLOW MOLDING APPLICATIONS

(71) Applicant: Chevron Phillips Chemical Company LP, The Woodlands, TX (US)

(72) Inventors: Jeremy M. Praetorius, Bartlesville, OK (US); Alfred E. Brown, Jr., Collinsville, OK (US); Yongwoo Inn, Bartlesville, OK (US); Youlu Yu, Bartlesville, OK (US); Qing Yang, Bartlesville, OK (US); Ashish M. Sukhadia, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 17/571,665

(22) Filed: Jan. 10, 2022

(65) Prior Publication Data
US 2022/0127395 A1 Apr. 28, 2022

Related U.S. Application Data

(63) Continuation of application No. 16/898,502, filed on Jun. 11, 2020, now Pat. No. 11,267,919.

(51) Int. Cl.
*C08F 210/16* (2006.01)
*B29C 49/00* (2006.01)
(Continued)

(52) U.S. Cl.
CPC ........ *C08F 210/16* (2013.01); *B29C 49/0005* (2013.01); *C08F 4/65927* (2013.01);
(Continued)

(58) Field of Classification Search
CPC . C08F 210/16; C08F 4/65927; C08F 2500/09
See application file for complete search history.

(56) References Cited

U.S. PATENT DOCUMENTS

| 3,113,166 A | 12/1963 | Weesner |
| 3,242,099 A | 3/1966 | Manyik |

(Continued)

FOREIGN PATENT DOCUMENTS

| CN | 105745234 A | 7/2016 |
| CN | 105849138 A | 8/2016 |

(Continued)

OTHER PUBLICATIONS

International Search Report and Written Opinion issued in related PCT Application No. PCT/US2022/080955, dated Apr. 6, 2023, 12 pp.

(Continued)

*Primary Examiner* — Rip A Lee
(74) *Attorney, Agent, or Firm* — Merchant & Gould P.C.

(57) ABSTRACT

Ethylene-based polymers are characterized by a melt index less than 1 g/10 min, a density from 0.94 to 0.965 g/cm³, a Mw from 100,000 to 250,000 g/mol, a relaxation time from 0.5 to 3 sec, and an average number of long chain branches (LCBs) per 1,000,000 total carbon atoms in a molecular weight range of 300,000 to 900,000 g/mol that is greater than that in a molecular weight range of 1,000,000 to 2,000,000 g/mol, or an average number of LCBs per 1,000,000 total carbon atoms in a molecular weight range of 1,000,000 to 2,000,000 g/mol of less than or equal to about 5 and a maximum ratio of $\eta_E/3\eta$ at an extensional rate of 0.1 sec$^{-1}$ from 1.2 to 10. These polymers have substantially no long chain branching in the high molecular weight fraction of the polymer, but instead have significant long chain branching in a lower molecular weight fraction, such that polymer melt strength and parison stability are maintained (Continued)

for the fabrication of blow molded products and other articles of manufacture. These ethylene polymers can be produced using a dual catalyst system containing a single or two atom bridged metallocene compound with two indenyl groups, and a single atom bridged metallocene compound with a fluorenyl group and a cyclopentadienyl group.

21 Claims, 10 Drawing Sheets

(51) Int. Cl.
    *C08F 4/6592*     (2006.01)
    *B29K 23/00*     (2006.01)
    *C08F 210/02*     (2006.01)

(52) U.S. Cl.
    CPC ........ *B29K 2023/08* (2013.01); *C08F 210/02* (2013.01); *C08F 2500/09* (2013.01); *C08F 2500/12* (2013.01); *C08F 2500/17* (2013.01)

(56) References Cited

U.S. PATENT DOCUMENTS

| | | | |
|---|---|---|---|
| 3,248,179 A | 4/1966 | Norwood | |
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 5,352,749 A | 10/1994 | Dechellis | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,807,938 A | 9/1998 | Kaneko | |
| 5,919,983 A | 7/1999 | Rosen | |
| 6,107,230 A | 8/2000 | Mcdaniel | |
| 6,136,936 A | 10/2000 | Dall'Occo | |
| 6,165,929 A | 12/2000 | Mcdaniel | |
| 6,239,235 B1 | 5/2001 | Hottovy | |
| 6,262,191 B1 | 7/2001 | Hottovy | |
| 6,294,494 B1 | 9/2001 | Mcdaniel | |
| 6,300,271 B1 | 10/2001 | Mcdaniel | |
| 6,316,553 B1 | 11/2001 | Mcdaniel | |
| 6,355,594 B1 | 3/2002 | Mcdaniel | |
| 6,376,415 B1 | 4/2002 | Mcdaniel | |
| 6,388,017 B1 | 5/2002 | Mcdaniel | |
| 6,391,816 B1 | 5/2002 | Mcdaniel | |
| 6,395,666 B1 | 5/2002 | Mcdaniel | |
| 6,524,987 B1 | 2/2003 | Collins | |
| 6,548,441 B1 | 4/2003 | Mcdaniel | |
| 6,548,442 B1 | 4/2003 | Mcdaniel | |
| 6,576,583 B1 | 6/2003 | Mcdaniel | |
| 6,576,586 B2 | 6/2003 | Siqin | |
| 6,613,712 B1 | 9/2003 | Mcdaniel | |
| 6,632,894 B1 | 10/2003 | Mcdaniel | |
| 6,667,274 B1 | 12/2003 | Hawley | |
| 6,750,302 B1 | 6/2004 | Mcdaniel | |
| 6,833,415 B2 | 12/2004 | Kendrick | |
| 7,026,494 B1 | 4/2006 | Yang | |
| 7,041,617 B2 | 5/2006 | Jensen | |
| 7,101,936 B2 | 9/2006 | Weng | |
| 7,226,886 B2 | 6/2007 | Jayaratne | |
| 7,294,599 B2 | 11/2007 | Jensen | |
| 7,312,283 B2 | 12/2007 | Martin | |
| 7,517,939 B2 | 4/2009 | Yang | |
| 7,531,606 B2 | 5/2009 | Hendrickson | |
| 7,598,327 B2 | 10/2009 | Shaw | |
| 7,601,665 B2 | 10/2009 | Mcdaniel | |
| 7,619,047 B2 | 11/2009 | Yang | |
| 7,732,542 B2 | 6/2010 | Yang | |
| 7,884,163 B2 | 2/2011 | Mcdaniel | |
| 8,114,946 B2 | 2/2012 | Yang | |
| 8,268,944 B2 | 9/2012 | Yang | |
| 8,288,487 B2 | 10/2012 | Yang | |
| 8,309,485 B2 | 11/2012 | Yang | |
| 8,383,754 B2 | 2/2013 | Yang | |
| 8,426,538 B2 | 4/2013 | Jensen | |
| 8,623,973 B1 | 1/2014 | Mcdaniel | |
| 8,822,608 B1 | 9/2014 | Bhandarkar | |
| 9,006,367 B2 | 4/2015 | Mcdaniel | |
| 9,023,959 B2 | 5/2015 | Mcdaniel | |
| 9,169,337 B2 | 10/2015 | Rohatgi | |
| 9,181,370 B2 | 11/2015 | Sukhadia | |
| 9,217,049 B2 | 12/2015 | Yang | |
| 9,273,170 B2 * | 3/2016 | Hlavinka | C08L 23/0815 |
| 9,303,109 B2 | 4/2016 | Greco | |
| 9,441,063 B2 * | 9/2016 | Cruz | C08F 110/02 |
| 9,574,031 B2 | 2/2017 | Yang | |
| 9,745,230 B2 | 8/2017 | Small | |
| 9,758,600 B1 | 9/2017 | Praetorius | |
| 9,856,339 B2 | 1/2018 | Mariott | |
| 9,975,976 B1 | 5/2018 | Tso | |
| 10,239,975 B2 | 3/2019 | Mcdaniel | |
| 10,604,604 B2 | 3/2020 | Yu | |
| 10,954,321 B2 | 3/2021 | Lee | |
| 11,014,997 B2 * | 5/2021 | Ding | C08F 2/34 |
| 11,339,279 B2 * | 5/2022 | Ding | C08L 23/0815 |
| 2003/0027950 A1 | 2/2003 | Uchino | |
| 2011/0172322 A1 | 7/2011 | Michel | |
| 2015/0126692 A1 | 5/2015 | Sukhadia | |
| 2015/0259444 A1 | 9/2015 | Rohatgi | |
| 2019/0185594 A1 | 6/2019 | Dreng | |
| 2020/0362064 A1 | 11/2020 | Ding | |
| 2021/0139619 A1 | 5/2021 | Ding | |
| 2021/0309841 A1 | 10/2021 | Ding | |
| 2022/0267579 A1 | 8/2022 | Ding | |
| 2023/0192909 A1 | 6/2023 | Mcdaniel | |
| 2023/0192914 A1 | 6/2023 | Mcdaniel | |

FOREIGN PATENT DOCUMENTS

| | | |
|---|---|---|
| CN | 104045902 B | 8/2017 |
| CN | 106459281 B | 8/2019 |
| CN | 108350113 B | 5/2021 |
| EP | 3369752 A1 | 9/2018 |
| RU | 2155776 C2 | 9/2000 |
| WO | 2011037971 A1 | 3/2011 |
| WO | 2014074622 A1 | 5/2014 |
| WO | 2014134028 A1 | 9/2014 |
| WO | 2015069637 A2 | 5/2015 |
| WO | 2015179628 A1 | 11/2015 |
| WO | 2019086905 A1 | 5/2019 |
| WO | 2020231667 A1 | 11/2020 |
| WO | 2021202190 A1 | 10/2021 |
| WO | 2023114660 A1 | 6/2023 |
| WO | 2023114773 A1 | 6/2023 |

OTHER PUBLICATIONS

Takao Tayano, et al., "Morphology control of clay-mineral particles as supports for metallocene catalysts in propylene polymerization", Polyolefins Journal, Jun. 30, 2016 (Jun. 30, 2016), pp. 79-92, XP093031232, DOI: 10.22063/poj.2016.1291, Retrieved from the Internet: URL:http://poj.ippi.ac.ir/article_1291_c35 5dfcae15c711f05f70524120eeeb2.pdf [retrieved on Mar. 13, 2023].
Andy H. Tsou, et al., "Processability-Enhanced Bimodal High-Density Polyethylene With Comb-Branched High-Density Polyethylene," Journal of Applied Polymer Science, 2018, , DOI: 10.1002/APP.45755, 7 pages.
B.H. Zimm, et al., "The Dimensions of Chain Molecules Containing Branches and Rings," Journal of Chemical Physics, vol. 17, No. 12, Dec. 1949, pp. 1301-1314.
Bird et al., entitled "Dynamics of Polymeric Liquids," vol. 1, Fluid Mechanics, 2nd Edition, John Wiley & Sons, 1987, 3 pages.
Film Extrusion Manual—Process, Materials, Properties, TAPPI Press, 1992, 16 pages.
Helmut G. Alt and Alexander Köppl, "Effect of the Nature of Metallocene Complexes of Group IV Metals on Their Performance in Catalytic Ethylene and Propylene Polymerization," Laboratorium

(56) References Cited

OTHER PUBLICATIONS fur Anorganische Chemie, Universität Bayreuth, D-95440 Bayreuth, Germany, Chem. Rev., 2000, 100 (4), pp. 1205-1221.

Tieber et al., entitled "Shear-Rate-Dependence Modeling of Polymer Melt Viscosity," Polymer Engineering and Science, 1992, 32(14), pp. 931-938.

Hieber et al., entitled "Some correlations involving the shear viscosity of polystyrene melts," Rheologica Acta, 1989, vol. 28, pp. 321-332.

IUPAC Compendium of Chemical Technology, 2nd Edition, 1997.

Janzen, et al., "Diagnosing Long-Chain Branching in Polyethylene," Journal of Mol. Struct., 485/486, 1999, pp. 569-584.

M.L. Sentmanat, et al., "Measuring the Transient Extensional Rheology of Polyethylene Melts Using the SER Universal Testing Platform," Journal of Rheology, vol. 49, 2005, pp. 585-606.

Martin L. Sentamanat, "Miniature Universal Testing Platform: From Extensional Melt Rheology to Solid-State Deformation Behavior," Rheol Acta, vol. 43, 2004, pp. 657-669.

Modern Plastics Encyclopedia, Mid-Nov. 1995 Issue, vol. 72, No. 12, 3 pages.

Paul J. DesLauriers, et al., "Long-Chain Branching in PE From Cr/Aluminophosphate Catalysts," Applied Catalysts A: General 388, Elsevier, 2010, pp. 102-112.

Qing Yang, et al., "Alternative View of Long Chain Branch Formation by Metallocene Catalysts," Macromolecules No. 43, Sep. 16, 2010, pp. 8836-8852.

Youlu Yu, "A Short-Chain Branching Distribution Determination Technique for Polyethylene Using IR5-Detected GPC," Macromolecular Symposia, 2020, 390, 1900014, pp. 1-10.

Youlu Yu, et al., "SEC-MALS Method for the Determination of Long-Chain Branching and Long-Chain Branching Distribution in Polyethylene," Science Direct, Polymer vol. 46, 2005, pp. 5165-5182.

Related U.S. Appl. No. 17/552,451, filed Dec. 16, 2021.

Search Report issued in corresponding CN Application No. 2021800188748, dated Jun. 29, 2023, 2 pp.

Search Report issued in corresponding CN Application No. 2021800350639 dated Jun. 5, 2023, 3 pp.

\* cited by examiner

DUAL CATALYST SYSTEM FOR PRODUCING POLYETHYLENE WITH LONG CHAIN BRANCHING FOR BLOW MOLDING APPLICATIONS

REFERENCE TO RELATED APPLICATION

This application is a continuation application of copending U.S. patent application Ser. No. 16/898,502, filed on Jun. 11, 2020, now U.S. Pat. No. 11,267,919, the disclosure of which is incorporated herein by reference in its entirety.

BACKGROUND OF THE INVENTION

Polyolefins such as high density polyethylene (HDPE) homopolymer and copolymer and linear low density polyethylene (LLDPE) copolymer can be produced using various combinations of catalyst systems and polymerization processes. Ziegler-Natta and chromium-based catalyst systems can, for example, produce ethylene polymers having good extrusion processability, polymer melt strength in pipe and blow molding applications, and bubble stability in blown film applications, typically due to their broad molecular weight distribution (MWD). Metallocene-based catalyst systems can, for example, produce ethylene polymers having excellent impact and toughness properties, but often at the expense of poor extrusion processability, melt strength, and bubble stability.

In some end-uses, such as blow molding, it can be beneficial to have the toughness properties of a metallocene-catalyzed copolymer, but with improved processability, strain hardening, and melt strength. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., ethylene/α-olefin copolymers) characterized by a melt index of less than or equal to about 1 g/10 min, a density in a range from about 0.94 to about 0.965 g/cm$^3$, a Mw in a range from about 100,000 to about 250,000 g/mol, and a relaxation time from about 0.5 to about 3 seconds.

These ethylene polymers can be further characterized by an average number of long chain branches (LCBs) per 1,000,000 total carbon atoms of the polymer in a molecular weight range of 300,000 to 900,000 g/mol that is greater (by at least 50%, at least 100%, or at least 200%) than that in a molecular weight range of 1,000,000 to 2,000,000 g/mol. Beneficially, most of the LCBs are present in lower molecular weight portions of the ethylene polymer, and not in the very high molecular weight fraction (often referred to as the high molecular weight tail of the molecular weight distribution). Additionally or alternatively, these ethylene polymers can be further characterized by an average number of LCBs per 1,000,000 total carbon atoms of the polymer in a molecular weight range of 1,000,000 to 2,000,000 g/mol of less than or equal to about 5 (effectively, little to no long chain branching in the high molecular weight end), and a maximum ratio of $\eta_E/3\eta$ at an extensional rate of 0.1 sec$^{-1}$ in a range from about 1.2 to about 10 (the ratio of extensional viscosity to 3 times the shear viscosity; for Newtonian fluids, the ratio is 1, and strain hardening results in ratios greater than 1).

Unexpectedly, there is substantially no long chain branching in the high molecular weight fraction of these polymers that might adversely impact properties of blow molded products. Beneficially, however, there is a significant amount of long chain branching in lower molecular weight fractions of the polymer, such that polymer melt strength and parison stability are maintained, as well as extrusion processability. The ethylene polymers disclosed herein can be used to produce various articles of manufacture, such as blow molded bottles and containers.

Another aspect of this invention is directed to a dual catalyst system, and in this aspect, the dual catalyst system can comprise catalyst component I comprising a single atom bridged or two atom bridged metallocene compound with two indenyl groups, catalyst component II comprising a single atom bridged metallocene compound with a fluorenyl group and a cyclopentadienyl group, and with an alkenyl substituent on the single atom bridge and/or on the cyclopentadienyl group, an activator, and optionally, a co-catalyst.

In yet another aspect, an olefin polymerization process is provided, and in this aspect, the process can comprising contacting any catalyst composition disclosed herein with an olefin monomer and an optional olefin comonomer in a polymerization reactor system under polymerization conditions to produce an olefin polymer. For instance, the olefin monomer can be ethylene, and the olefin comonomer can be 1-butene, 1-hexene, 1-octene, or a mixture thereof.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
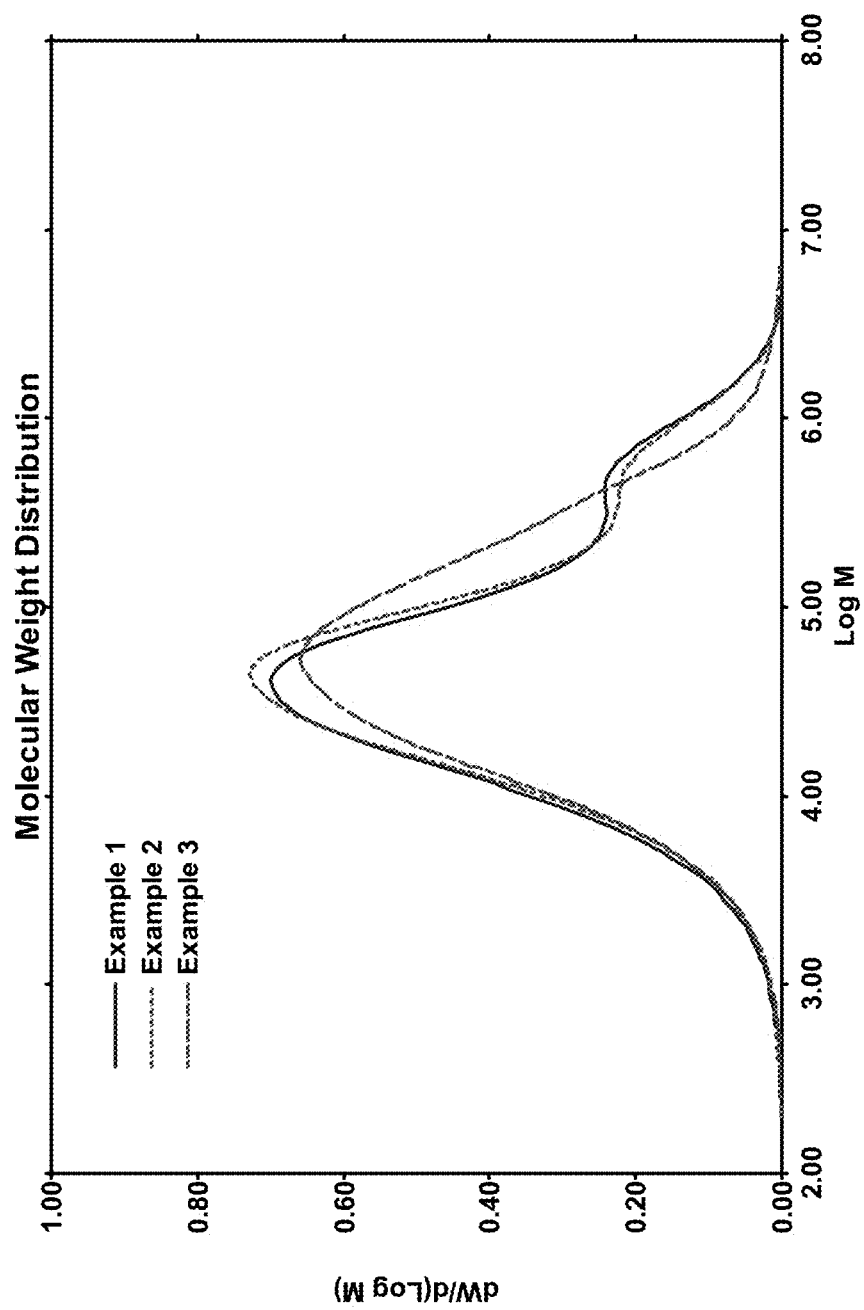
FIG. 1 presents a plot of the molecular weight distributions of the polymers of Examples 1-2 and Comparative Example 3.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized as an ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^1$ to $\eta^5$-cycloalkadienyl-type moiety, wherein $\eta^1$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, catalyst component I, catalyst component II, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from about 5 to about 15, the intent is to recite that the ratio of Mw/Mn can be any ratio in the range and, for example, can be equal to about 5, about 6, about 7, about 8, about 9, about 10, about 11, about 12, about 13, about 14, or about 15. Additionally, the ratio of Mw/Mn can be within any range from about 5 to about 15 (for example, from about 6 to about 10), and this also includes any combination of ranges between about 5 and about 15 (for example, the Mw/Mn ratio can be in a range from about 6 to about 9, or from about 11 to about 14). Further, in all instances, where "about" a particular value is disclosed, then that value itself is disclosed. Thus, the disclosure that the ratio of Mw/Mn can be from about 5 to about 15 also discloses a ratio of Mw/Mn from 5 to 15 (for example, from 6 to 10), and this also includes any combination of ranges between 5 and 15 (for example, the Mw/Mn ratio can be in a range from 6 to 9, or from 11 to 14). Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to dual metallocene ethylene-based polymers having similar processability to chromium-based polymers, but with improved ESCR and toughness properties. Articles produced from these ethylene-based polymers can include blow molded products, such as blow molded bottles.

Generally, metallocene-derived ethylene-based polymers with long chain branches have those long chain branches concentrated in the high molecular weight fraction of the polymer. Advantageously, the ethylene polymers disclosed herein have substantially no long chain branching in the high molecular weight fraction of the polymer; instead, significant amounts of long chain branching are present in lower molecular weight fractions of the polymer.

These ethylene polymers can be produced, for example, with a dual metallocene catalyst system in a single reactor. It was found that using a first metallocene catalyst that preferentially produces lower molecular weight polyethylene with relatively high LCB content in combination with a second metallocene catalyst that preferentially produces higher molecular weight, essentially linear polyethylene can result in the unique combination of polymer properties described herein.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof, or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof, alternatively, an ethylene/1-butene copolymer, an ethylene/1-hexene copolymer, an ethylene/1-octene copolymer, or any combination thereof, or alternatively, an ethylene/1-hexene copolymer.

An illustrative and non-limiting example of an ethylene polymer (e.g., comprising an ethylene copolymer) of the present invention can have a melt index of less than or equal to about 1 g/10 min, a density in a range from about 0.94 to about 0.965 g/cm$^3$, a Mw in a range from about 100,000 to about 250,000 g/mol, a relaxation time from about 0.5 to about 3 sec, and an average number of long chain branches (LCBs) per 1,000,000 total carbon atoms of the polymer in a molecular weight range of 300,000 to 900,000 g/mol that is greater (for instance, at least 50% greater, or at least 75% greater, or at least 100% greater, or at least 150% greater, or at least 200% greater) than that in a molecular weight range of 1,000,000 to 2,000,000 g/mol. Another illustrative and non-limiting example of an ethylene polymer (e.g., comprising an ethylene copolymer) of the present invention can have a melt index of less than or equal to about 1 g/10 min, a density in a range from about 0.94 to about 0.965 g/cm$^3$, a Mw in a range from about 100,000 to about 250,000 g/mol, a relaxation time from about 0.5 to about 3 sec, an average number of long chain branches (LCBs) per 1,000,000 total carbon atoms of the polymer in a molecular weight range of 1,000,000 to 2,000,000 g/mol of less than or equal to about 5, and a maximum ratio of $\eta_E/3\eta$ at an extensional rate of 0.1 sec in a range from about 1.2 to about 10. These ethylene polymers also can have any of the polymer properties listed below and in any combination, unless indicated otherwise.

The densities of ethylene-based polymers disclosed herein often are greater than or equal to about 0.94 g/cm$^3$, and less than or equal to about 0.965 g/cm$^3$. Yet, in particular aspects, the density can be in a range from about 0.942 to about 0.965 g/cm$^3$, from about 0.94 to about 0.96 g/cm$^3$, from about 0.95 to about 0.965 g/cm$^3$, from about 0.955 to about 0.962 g/cm$^3$, or from about 0.955 to about 0.96 g/cm$^3$.

Ethylene polymers described herein often can have a melt index (MI) of less than or equal to about 1 g/10 min, less than or equal to about 0.7 g/10 min, or less than or equal to about 0.5 g/10 min. In further aspects, ethylene polymers described herein can have a melt index (MI) in a range from about 0.1 to about 0.7 g/10 min, from about 0.1 to about 0.5 g/10 min, from about 0.2 to about 0.7 g/10 min, or from about 0.2 to about 0.4 g/10 min.

While not being limited thereto, the ethylene polymer also can have a high load melt index (HLMI) in a range from about 10 to about 65 g/10 min; alternatively, from about 35 to about 55 g/10 min; alternatively, from about 20 to about 60 g/10 min; or alternatively, from about 40 to about 55 g/10 min.

The ratio of high load melt index (HLMI) to melt index (MI), referred to as the ratio of HLMI/MI, is not particularly limited, but typically ranges from about 80 to about 220, from about 100 to about 200, from about 120 to about 170, or from about 130 to about 160. In this HLMI/MI ratio, the melt index is not equal to zero.

In an aspect, ethylene polymers described herein can have a ratio of Mw/Mn, or the polydispersity index, in a range from about 5 to about 15, from about 6 to about 12, from about 6 to about 10, from about 7 to about 13, or from about 7 to about 10. Additionally or alternatively, the ethylene polymer can have a ratio of Mz/Mw in a range from about 3.5 to about 10, from about 4 to about 8, from about 4 to about 6, or from about 4.5 to about 5.5.

In an aspect, ethylene polymers described herein can have a weight-average molecular weight (Mw) in a range from about 125,000 to about 250,000 g/mol, from about 100,000 to about 200,000 g/mol, from about 110,000 to about 190,000 g/mol, or from about 125,000 to about 175,000 g/mol. Additionally or alternatively, the ethylene polymer can have a number-average molecular weight (Mn) in a range from about 10,000 to about 30,000 g/mol, from about 10,000 to about 25,000 g/mol, from about 15,000 to about 25,000 g/mol, or from about 15,000 to about 20,000 g/mol. Additionally or alternatively, the ethylene polymer can have a z-average molecular weight (Mz) in a range from about 500,000 to about 2,000,000 g/mol, from about 600,000 to about 1,200,000 g/mol, from about 650,000 to about 1,000,000 g/mol, or from about 700,000 to about 900,000 g/mol.

Ethylene polymers consistent with certain aspects of the invention often can have a bimodal molecular weight distribution (as determined using gel permeation chromatography (GPC) or other related analytical technique). Often, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754, incorporated herein by reference in its entirety.

While not limited thereto, ethylene polymers described herein can have a zero-shear viscosity at 190° C. in a range from about $1 \times 10^3$ to about $1 \times 10^8$ Pa-sec, from about $1 \times 10^4$ to about $1 \times 10^7$ Pa-sec, or from about $1 \times 10^4$ to about $1 \times 10^6$ Pa-sec. Moreover, these ethylene polymers can have a CY-a parameter from about 0.15 to about 0.45, from about 0.2 to about 0.4, from about 0.22 to about 0.35, or from about 0.22 to about 0.32. Additionally or alternatively, these ethylene polymers can have a relatively short relaxation time given their relatively high molecular weight, with the relaxation time typically in a range from about 0.5 to about 3 sec, such as from about 0.75 to about 2.5 sec, from about 1 to about 2 sec, or from about 1 to about 1.5 sec. Additionally or alternatively, these ethylene polymers can be characterized by a viscosity at HLMI (eta @ HLMI or $\eta$@ HLMI) at 190° C. in a range from about 250 to about 800 Pa-sec, and more often, in a range from about 300 to about 750, from about 300 to about 500, from about 300 to about 450, or from about 350 to about 450 Pa-sec. Additionally or alternatively, these ethylene polymers can have a viscosity at 100 sec$^{-1}$ (eta @ 100 or $\eta$ @ 100) at 190° C. in a range from about 750 to about 1750, from about 850 to about 1300, from about 1000 to about 1500, or from about 1000 to about 1300 Pa-sec. Additionally or alternatively, these ethylene polymers can have a ratio of $\eta$@ 0.1/$\eta$@ 100 (the viscosity at 0.1 sec$^{-1}$ divided by the viscosity at 100 sec$^{-1}$) in a range from about 20 to about 45, from about 20 to about 35, from about 22 to about 32, or from about 25 to about 30. These rheological parameters are determined from viscosity data measured at 190° C. and using the Carreau-Yasuda (CY) empirical model as described herein.

The average number of long chain branches (LCBs) per 1,000,000 total carbon atoms of the ethylene polymer in a molecular weight range of 1,000,000 to 2,000,000 g/mol can be less than or equal to about 5 (there is effectively no LCB in the high molecular weight fraction of the polymer). All average numbers of LCBs disclosed herein are number-average numbers. In some aspects, the average number of LCBs per 1,000,000 total carbon atoms of the polymer in the molecular weight range of 1,000,000 to 2,000,000 g/mol can be less than or equal to about 4, less than or equal to about 3.5, less than or equal to about 3, or less than or equal to about 1. In further aspects, the average number of LCBs in this molecular weight range can be below the detection limit.

The average number of LCBs per 1,000,000 total carbon atoms of the ethylene polymer in a molecular weight range of 300,000 to 900,000 g/mol can be greater (by any amount disclosed herein, e.g., at least 50%, at least 75%, at least 100%, at least 150%, or at least 200%, and often up to 400-800%, or more) than the average number of LCBs per 1,000,000 total carbon atoms in a molecular weight range of 1,000,000 to 2,000,000 g/mol. In some aspects, the average number of LCBs per 1,000,000 total carbon atoms of the ethylene polymer in a molecular weight range of 300,000 to 900,000 g/mol can be at least 50% greater (or at least 75% greater, or at least 100% greater, or at least 150% greater, or at least 200% greater, and often up to 400-800% greater) than that in a molecular weight range of 1,000,000 to 2,000,000 g/mol. As disclosed herein, all average numbers of LCBs are number-average numbers.

The average number of LCBs per 1,000,000 total carbon atoms of the ethylene polymer in the molecular weight range of 300,000 to 900,000 g/mol is not particularly limited, but often falls within a range from about 3 to about 15; alternatively, from about 4 to about 13; alternatively, from about 4 to about 10; alternatively, from about 5 to about 9; or alternatively, from about 6 to about 8.

Likewise, the average number of LCBs per 1,000,000 total carbon atoms of the ethylene polymer in the molecular weight range of 400,000 to 600,000 g/mol is not particularly limited, but often falls within a range from about 4 to about 15; alternatively, from about 5 to about 14; alternatively, from about 5 to about 12; alternatively, from about 7 to about 10; or alternatively, from about 8 to about 9.

In the overall polymer (using the Janzen-Colby model), the ethylene polymers typically have levels of long chain branches (LCBs) in a range from about 4 to about 20 LCBs, from about 5 to about 15 LCBs, from about 6 to about 14 LCBs, or from about 8 to about 12 LCBs, per 1,000,000 total carbon atoms.

Unexpectedly, the ethylene polymers described herein can have a maximum ratio of $\eta_E/3\eta$ at an extensional rate of 0.1 sec$^{-1}$ in a range from about 1.2 to about 10. For Newtonian fluids, the ratio of extensional viscosity to 3 times the shear viscosity is equal to 1, while strain hardening due to long chain branching can lead to ratios of greater than 1. In one aspect, the maximum ratio of $\eta_E/3\eta$ at the extensional rate of 0.1 sec$^{-1}$ can range from about 1.2 to about 10, or from about 1.5 to about 8, while in another aspect, the maximum ratio can range from about 1.5 to about 5, or from about 1.2 to about 4, and in yet another aspect, the maximum ratio can range from about 1.2 to about 3, or from about 1.4 to about 3.5, and in still another aspect, the maximum ratio can range from about 1.4 to about 3, or from about 1.5 to about 2.5. These ratios of extensional viscosity to three times the shear viscosity are determined using a Sentmanat Extensional Rheometer (SER) at 150° C.

Additionally, while not being limited thereto, the ethylene polymer can be characterized further by a maximum ratio of $\eta_E/3\eta$ at an extensional rate of 0.03 sec$^{-1}$ in a range from about 1.2 to about 10; alternatively, from about 1.5 to about 8; alternatively, from about 2 to about 7; alternatively, from about 2 to about 5; alternatively, from about 2.5 to about 4.5; or alternatively, from about 3 to about 4.

Moreover, the ethylene polymers (e.g., ethylene copolymers) typically can have a flat short chain branching distribution (flat SCBD; uniform comonomer distribution). A flat SCBD can be characterized by a slope of a plot of the number of short chain branches (SCBs) per 1000 total carbon atoms versus the logarithm of molecular weight of the ethylene polymer (determined via linear regression over the range from D15 to D85) that is in a range from about −0.6 to about 0.6, and/or a percentage of data points deviating from the average short chain branch content by greater than 0.5 SCBs per 1000 total carbon atoms (determined over the range from D15 to D85) that is less than or equal to about 20%, and/or a percentage of data points deviating from the average short chain branch content by greater than 1 SCB per 1000 total carbon atoms (determined over the range from D15 to D85) that is less than or equal to about 10%. Polymers having a flat or uniform SCBD are disclosed, for example, in U.S. Pat. Nos. 9,217,049 and 9,574,031, which are incorporated herein by reference in their entirety.

Aspects of this invention also are directed to the performance of the ethylene polymer (e.g., an ethylene/1-hexene copolymer) on representative blow molding equipment, as described herein below. The ethylene polymers can have a cycle time from about 13 to about 20, from about 14 to about 19, from about 15 to about 18, or from about 16 to about 17 seconds; unexpectedly, these polymers can have cycle times that are substantially the same as that of comparable chromium-based resins. Additionally or alternatively, ethylene polymers described herein can have a part weight in a range from about 95 to about 115, from about 100 to about 115, from about 95 to about 110, or from about 100 to about 110 grams. Additionally or alternatively, ethylene polymers described herein can have a layflat (top) in a range from about 5.2 to about 6, from about 5 to about 5.7, or from about 5.2 to about 5.7 inches.

Consistent with aspects of this disclosure, the ethylene polymers can have a "bottle" environmental stress crack resistance (ESCR) of at least 200 hours. Moreover, in some aspects, the ethylene polymers can have an ESCR of at least 250 hours, at least 300 hours, at least 400 hours, or at least 500 hours, and often can range as high as 600 to 1000 hours. The "bottle" ESCR test is typically stopped after a certain number of hours is reached, and given the long duration of the test, the upper limit of ESCR (in hours) is generally not determined. The "bottle" ESCR test is conducted in 10% Igepal at 140° F. (ASTM D2561), which is a much more stringent test than ESCR testing conducted using a 100% igepal solution. Additionally or alternatively, the ethylene polymers can have a "bent strip" (ESCR) of at least 50 hours, such as at least 60 hours, at least 75 hours, at least 85 hours, or at least 100 hours, and often can range as high as 150 to 300 hours. As above, the "bent strip" ESCR test is typically stopped after a certain number of hours is reached, and given the long duration of the test, the upper limit of ESCR (in hours) is generally not determined. The "bent strip" ESCR test is conducted in 10% Igepal at 50° C. for a 75 mil thickness (ASTM D1693).

In an aspect, the ethylene polymer can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product. Additionally, the ethylene polymer can further contain any suitable additive, non-limiting examples of which include an antioxidant, an acid scavenger, an antiblock additive, a slip additive, a colorant, a filler, a polymer processing aid, a UV additive, and the like, as well as any combination thereof.

Moreover, the ethylene polymers can be produced with a metallocene catalyst system containing zirconium and hafnium, discussed further below. Ziegler-Natta, chromium, and titanium metallocene based catalysts systems are not required. Therefore, the ethylene polymer can contain no measurable amount of chromium or titanium (catalyst residue), i.e., less than 0.1 ppm by weight. In some aspects, the ethylene polymer can contain, independently, less than 0.08 ppm, less than 0.05 ppm, or less than 0.03 ppm, of chromium and titanium.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of olefin polymers (or ethylene polymers) described herein, and the article of manufacture can be or can comprise a blow molded product.

Also contemplated herein is a method for forming or preparing an article of manufacture comprising any polymer disclosed herein. For instance, a method can comprise (i) contacting a catalyst composition with an olefin monomer (e.g., ethylene) and an optional olefin comonomer under polymerization conditions in a polymerization reactor system to produce an olefin polymer (e.g., an ethylene polymer), wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the olefin polymer (or ethylene polymer). The forming step can comprise blending, melt processing, extruding, molding (e.g., blow molding), or thermoforming, and the like, including combinations thereof. Any suitable additive can be combined with the polymer in the melt processing step (extrusion step), such as antioxidants, acid scavengers, antiblock additives, slip additives, colorants, fillers, processing aids, UV inhibitors, and the like, as well as combinations thereof.

Catalyst Systems and Polymerization Processes

In accordance with aspects of the present invention, the olefin polymer (e.g., the ethylene polymer) can be produced using a dual catalyst system. In these aspects, catalyst component I can comprise any suitable single atom bridged or two atom bridged metallocene compound with two indenyl groups, or any single atom bridged or two atom bridged metallocene compound disclosed herein with two indenyl groups. Catalyst component II can comprise any suitable single atom bridged metallocene compound with a fluorenyl group and a cyclopentadienyl group, and with an alkenyl substituent on the single atom bridge and/or on the cyclopentadienyl group, or any single atom bridged metallocene compound disclosed herein with a fluorenyl group and a cyclopentadienyl group, and with an alkenyl substituent on the single atom bridge and/or on the cyclopentadienyl group. The catalyst system also can comprise any suitable activator or any activator disclosed herein, and optionally, any suitable co-catalyst or any co-catalyst disclosed herein.

Referring first to catalyst component II, which can comprise a single atom bridged metallocene compound with a fluorenyl group and a cyclopentadienyl group; an alkenyl substituent can be present on the single atom bridge, or on the cyclopentadienyl group, or both. In one aspect, the fluorenyl group can be substituted, while in another aspect, the fluorenyl group can be unsubstituted. Additionally, the bridged metallocene compound of catalyst component II can contain zirconium, hafnium, or titanium, or alternatively, zirconium or hafnium. Further, the single atom bridge can be a single carbon atom or a single silicon atom, although not limited thereto. In some aspects, this bridging atom can have two substituents independently selected from H or any $C_1$ to $C_{18}$ hydrocarbyl group disclosed herein (e.g., one substituent, or both substituents, can be a phenyl group). The alkenyl substituent on the cyclopentadienyl group (or on the bridging atom) can be any suitable alkenyl group, such as a $C_3$ to $C_{18}$ alkenyl group, or a $C_3$ to $C_8$ terminal alkenyl group.

Catalyst component II can comprise, in particular aspects of this invention, a bridged metallocene compound having formula (II):

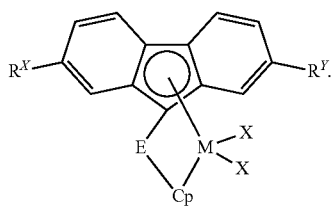

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

In accordance with aspects of this invention, the metal in formula (II), M, can be Ti, Zr, or Hf. In one aspect, for instance, M can be Zr or Hf, while in another aspect, M can be Ti; alternatively, M can be Zr; or alternatively, M can be Hf.

Each X in formula (II) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand. In addition to representative selections for each X that are disclosed herein, additional suitable hydrocarbyl groups, hydrocarboxy groups, hydrocarbylaminyl groups, hydrocarbylsilyl groups, and hydrocarbylaminylsilyl groups are disclosed, for example, in U.S. Pat. No. 9,758,600, incorporated herein by reference in its entirety.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^1_2$, or $OSO_2R^1$, wherein $R^1$ is a $C_1$ to $C_{18}$ hydrocarbyl group. In another aspect, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^1_2$, or $OSO_2R^1$, wherein $R^1$ is a $C_1$ to $C_{12}$ hydrocarbyl group. In another aspect, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^1_2$, or $OSO_2R^1$, wherein $R^1$ is a $C_1$ to $C_{10}$ hydrocarbyl group. In yet another aspect, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^1_2$, or $OSO_2R^1$, wherein $R^1$ is a $C_1$ to $C_8$ hydrocarbyl group. In still another aspect, each X independently can be a halide or a $C_1$ to $C_{18}$ hydrocarbyl group. For example, each X can be $C_1$.

In one aspect, each X independently can be H, $BH_4$, a halide, or a $C_1$ to $C_{36}$ hydrocarbyl, hydrocarboxy group, hydrocarbylaminyl group, hydrocarbylsilyl group, or hydrocarbylaminylsilyl group, while in another aspect, each X independently can be H, $BH_4$, or a $C_1$ to $C_{18}$ hydrocarboxy group, hydrocarbylaminyl group, hydrocarbylsilyl group, or hydrocarbylaminylsilyl group. In yet another aspect, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, each X can be H; alternatively, F; alternatively, $C_1$; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, $C_1$, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (II), Cp can be a cyclopentadienyl group, optionally with an alkenyl substituent. In some aspects, Cp can contain no additional substituents, other than the alkenyl substituent. In other aspects, Cp can be further substituted with one substituent, two substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the cyclopentadienyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein. In addition to representative substituents that are disclosed herein, additional suitable hydrocarbyl groups, halogenated hydrocarbyl groups, hydrocarboxy groups, and hydrocarbylsilyl groups are disclosed, for example, in U.S. Pat. No. 9,758,600, incorporated herein by reference in its entirety.

In one aspect, for example, each substituent on Cp independently can be a $C_1$ to $C_{12}$ hydrocarbyl group or a $C_1$ to $C_{12}$ hydrocarbylsilyl group. In another aspect, each substituent on Cp independently can be a $C_1$ to $C_8$ alkyl group or a $C_3$ to $C_8$ alkenyl group.

In yet another aspect, each substituent on Cp independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein. In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group or, alternatively, a $C_1$ to $C_6$ alkyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be a bridging group having the formula $>E^A R^A R^B$, wherein $E^A$ can be C, Si, or Ge, and $R^A$ and $R^B$ independently can be H or a $C_1$ to $C_{18}$ hydrocarbyl group. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

Illustrative and non-limiting examples of bridged metallocene compounds having formula (II) and/or suitable for use as catalyst component II can include the following compounds (Me=methyl, Ph=phenyl; t-Bu=tert-butyl):

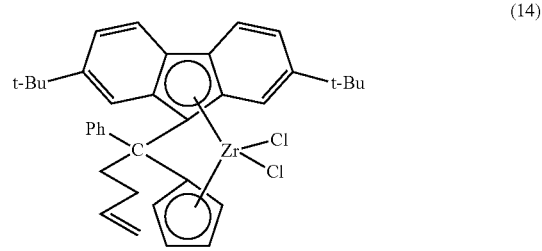

(14)

-continued
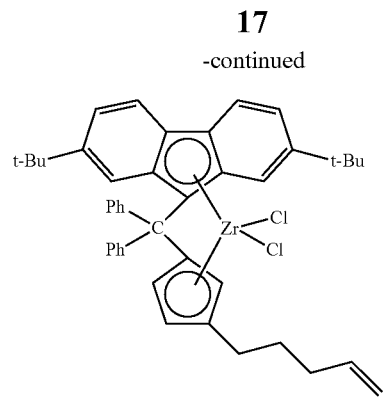
(15)
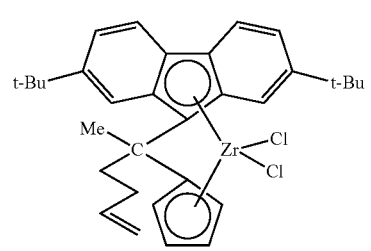
(16)
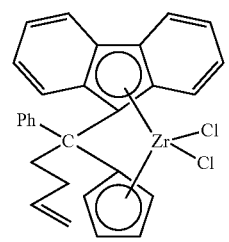
(17)
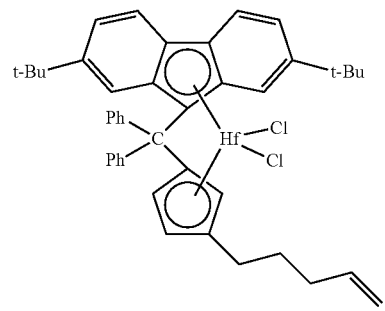
(18)
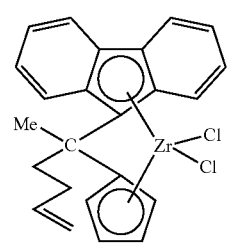
(19)
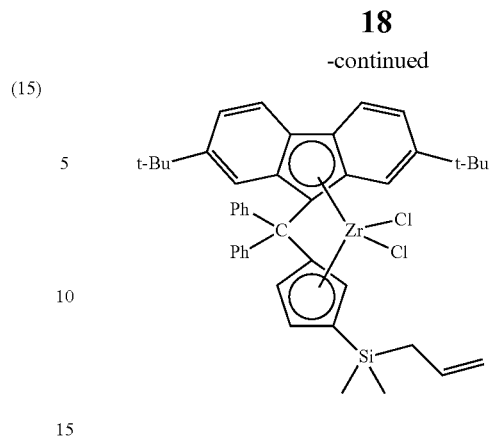
(20)
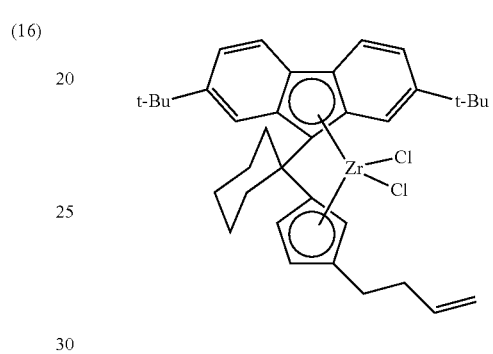
(21)
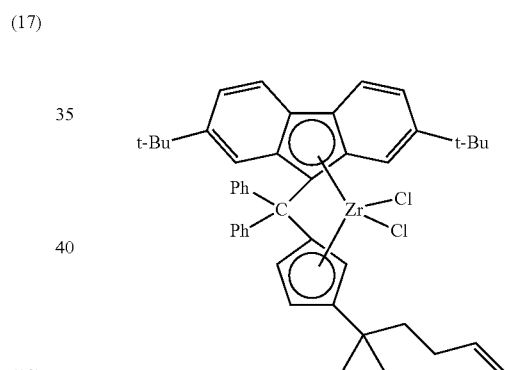
(22)
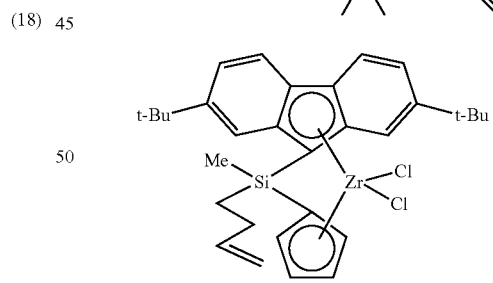
(23)
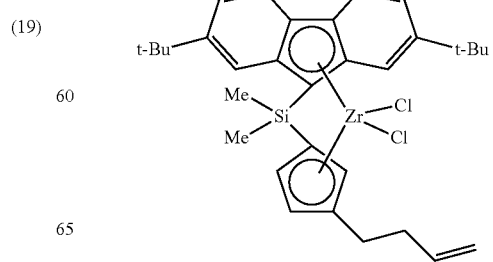
(24)

-continued

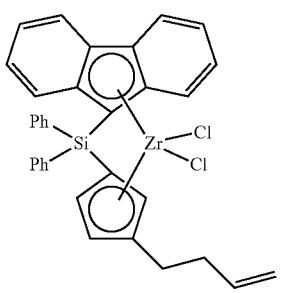

(25)

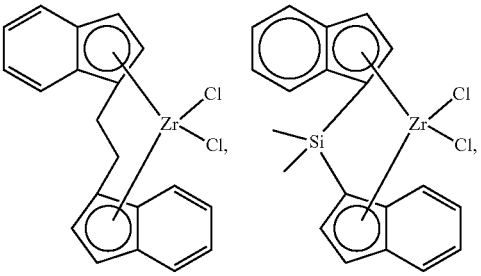

and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

Referring now to catalyst component I, which can comprise, in particular aspects of this invention, a single atom bridged or two atom bridged (two atom chain) metallocene compound with two indenyl groups. In some aspects, the metallocene compound contains two unsubstituted indenyl groups. The bridge can be a single carbon atom; alternatively, a single silicon atom; alternatively, a two carbon atom bridge; or alternatively, a two silicon atom bridge. Independently, any bridging atom (or atoms) can have two substituents independently selected from H or a $C_1$ to $C_{18}$ hydrocarbyl group, or from H or a $C_1$ to $C_8$ hydrocarbyl group; alternatively, two substituents independently selected from H or a $C_1$ to $C_6$ alkyl group; or alternatively, two substituents independently selected from a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group. The two substituents can be either the same or different.

If the metallocene compound is a two carbon atom bridged metallocene compound, the bridging group can have the formula —$CR^CR^D$—$CR^ER^F$—, wherein $R^C$, $R^D$, $R^E$, and $R^F$ independently can be H or any $C_1$ to $C_{18}$ hydrocarbyl group disclosed herein (and similarly for a two silicon atom bridge). For instance, $R^C$, $R^D$, $R^E$, and $R^F$ independently can be H or a $C_1$ to $C_6$ alkyl group, or alternatively, H or a methyl group.

In other aspects, at least one indenyl group is substituted (thus, one or both indenyl groups can be substituted). As above, the bridge can be a single carbon atom, a single silicon atom, a two carbon atom bridge, or a two silicon atom bridge, and further, each bridging atom (or atoms) can have two substituents independently selected from H or a $C_1$ to $C_{18}$ hydrocarbyl group (e.g., a $C_1$ to $C_6$ alkyl group). Any substituent on either indenyl group also can be independently selected from H or a $C_1$ to $C_{18}$ hydrocarbyl group (e.g., a $C_1$ to $C_6$ alkyl group). While not limited thereto, catalyst component I typically contains zirconium.

Illustrative and non-limiting examples of metallocene compounds suitable for use as catalyst component I can include the following compounds:

and the like, as well a combination thereof.

Catalyst component I is not limited solely to the bridged metallocene compounds such as described above. Other suitable metallocene compounds are disclosed in U.S. Pat. Nos. 8,288,487 and 8,426,538, which are incorporated herein by reference in their entirety.

According to an aspect of this invention, the weight ratio of catalyst component I to catalyst component II in the catalyst composition can be in a range from about 25:1 to about 1:25, from about 10:1 to about 1:10, from about 8:1 to about 1:8, from about 5:1 to about 1:5, from about 3:1 to about 1:3; from about 2:1 to about 1:2, from about 1.5:1 to about 1:1.5, from about 1.25:1 to about 1:1.25, or from about 1.1:1 to about 1:1.1. In another aspect, catalyst component II is the minor component of the catalyst composition, and in such aspects, the weight ratio of catalyst component I to catalyst component II in the catalyst composition can be in a range from about 1:1 to about 10:1, from about 1.2:1 to about 5:1, from about 1.5:1 to about 4:1, or from about 1.5:1 to about 2.5:1.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 250 grams of ethylene polymer (homopolymer and/or copolymer, as the context requires) per gram of activator-support per hour (abbreviated g/g/hr). In another aspect, the catalyst activity can be greater than about 350, greater than about 450, or greater than about 550 g/g/hr. Yet, in another aspect, the catalyst activity can be greater than about 700 g/g/hr, greater than about 1000 g/g/hr, or greater than about 2000 g/g/hr, and often as high as 3500-6000 g/g/hr. Illustrative and non-limiting ranges for the catalyst activity include from about 500 to about 5000, from about 750 to about 4000, or from about 1000 to about 3500 g/g/hr, and the like. These activities are measured under slurry polymerization conditions, with a triisobutylaluminum co-catalyst, using isobutane as the diluent, at a polymerization temperature of about 95° C. and a reactor pressure of about 590 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, catalyst component I, catalyst component II, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 100° C., or from about 75° C. to about 95° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof, alternatively, the comonomer can comprise 1-butene, 1-hexene, 1-octene, or any combination thereof, alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 μL was used. The integral calibration method was used to deduce molecular weights and molecular weight distributions using a Chevron Phillips Chemical Company's HDPE polyethylene resin, MARLEX® BHB5003, as the standard. The integral table of the standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987); each of which is incorporated herein by reference in its entirety. A creep adjustment was used to extend the low frequency range of rheological characterization to 10$^{-4}$ sec$^{-1}$, as described in U.S. Pat. No. 9,169,337, incorporated herein by references in its entirety.

Polymer viscosities at 0.1 sec$^{-1}$, at 100 sec$^{-1}$, and at HLMI were determined from the Carreau-Yasuda model at 190° C. with creep adjustment, described hereinabove.

The long chain branches (LCBs) per 1,000,000 total carbon atoms of the overall polymer were calculated using the method of Janzen and Colby (J. Mol. Struct., 485/486, 569-584 (1999), incorporated herein by reference in its entirety), from values of zero shear viscosity, $\eta_o$ (determined from the Carreau-Yasuda model with creep adjustment, described hereinabove) and measured values of Mw obtained using a Dawn EOS multiangle light scattering detector (Wyatt).

LCB content and LCB distribution were determined using the method established by Yu, et al (Yu, DesLauriers, Rohlfing, Polymer, 2015, 46, 5165-5192, incorporated herein by reference in its entirety). Briefly, in the SEC-MALS system, a DAWN EOS photometer (Wyatt Technology, Santa Barbara, CA) was attached to a Waters 150-CV plus GPC system (Milford, MA) or a PL-210 GPC system (Polymer Labs, an Agilent company) through ahot-transfer line controlled at 145° C. Degassed mobile phase 1,2,4-trichlorobenzene (TCB) containing 0.5 wt % of BHT (butylated hydroxytoluene) was pumped through an inline filter before passing through a SEC column bank. Polymer solutions injected to the system were brought downstream to the columns by the mobile phase for fractionation. The fractionated polymers first eluted through the MALS photometer where light scattering signals were recorded before passing through the differential refractive index detector (DRI) or an IR4 detector (Polymer Characterization SA, Spain) where their concentrations were quantified.

The DAWN EOS system was calibrated with neat toluene at room temperature to convert the measured voltage to intensity of scattered light. During the calibration, toluene was filtered with a 0.02 um filter (Whatman) and directly passed through the flowcell of the EOS system. At room temperature, the Rayleigh ratio is given by $1.406 \times 10^{-5}$ cm$^{-1}$. A narrow polystyrene (PS) standard (American Polymer Standards) with MW of 30,000 g/mol at a concentration about 5~10 mg/mL in TCB was employed to normalize the system at 145° C. At the given chromatographic conditions, the radius of gyration ($R_g$) of the polystyrene (PS) was estimated to be 5.6 nm. The differential refractive index detector (DRI) was calibrated with a known quantity of PE standard. By averaging the total chromatographic areas of recorded chromatograms for at least five injections, the DRI constant ($\alpha_{RI}$) was obtained using the equation below (equation 1):

$$\alpha_{RI} = \left(\frac{dn}{dc}\right) c / I_{RI} \qquad \text{Equation 1}$$

where $I_{RI}$ is the DRI detector intensity, c is the polymer concentration, and dn/dc is the refractive index increment of PE in TCB at the measuring temperature.

At a flow rate set at 0.7 mL/min, the mobile phase was eluted through three (3) 7.5 mm×300 mm 20 μm mixed A columns (Polymer Labs, an Agilent company). PE solutions with nominal concentrations of 1.5 mg/mL were prepared at 150° C. for 4 h. At each chromatographic slice, both the absolute molecular weight (M) and the root mean square (RMS) radius, aka, radius of gyration, $R_g$, were obtained from the Debye plots. The linear PE control employed was CPChem Marlex™ HiD9640, a high-density PE with broad MWD. The refractive index increment dn/dc used in this study was 0.097 mL/g for PE dissolved in TCB at 135° C.

The Zimm-Stockmayer approach (Zimm, Stockmayer, J. Chem. Phys. 1949, 17, 1301, incorporated herein by reference in its entirety) was employed to determine the amount of LCB in the polyethylene resins. In SEC-MALS, both M and $R_g$ were measured simultaneously at each slice of a chromatogram. At the same molecular weight, $R_g$ of a branched polymer is smaller than that of a linear polymer. The branching index ($g_M$) factor is defined as the ratio of the mean square radius of gyration of the branched polymer to that of the linear one at the same molecular weight using equation 2, $$g_M \equiv \left(\frac{\langle R_g^2 \rangle_b}{\langle R_g^2 \rangle_l}\right)_M \qquad \text{Equation 2}$$

where the subscripts b and l represent the branched and linear polymer, respectively.

The weight-average LCB per molecule ($B_{3w}$) was calculated using Equation 3 using an in-house software, $$g_M = \frac{6}{B_{3w}} \left\{ \frac{1}{2} \left(\frac{2+B_{3w}}{B_{3w}}\right)^{1/2} \ln\left[\frac{(2+B_{3w})^{1/2}+(B_{3w})^{1/2}}{(2+B_{3w})^{1/2}-(B_{3w})^{1/2}}\right] - 1 \right\} \qquad (3)$$

LCB frequency ($\lambda_{M_i}$, number of LCB per 1,000 total carbons) was calculated using equation 4 using the $B_{3w}$ value obtained from equation 3, $$\lambda_{M_i} = 1,000 \times M_0 \times B_{3w}/M_i \qquad (4)$$

where $M_0$ is the unit molecular weight of polyethylene, $M_i$ is the molecular weight of the $i^{th}$ slice.

Since the presence of SCB in a polymer can affect its $R_g$-MW relationship, the SCB effect was corrected before using equation 3 and 4 for LCB and LCB distribution calculation for PE copolymers. To correct the SCB effect on the branching index across the MWD, two relationships are needed: one is the relationship between the branching-index correction factor ($\Delta g_M$) and the SCB content ($x_{SCB}$), and the other is the relationship between SCB content and molecular weight, both of which were determined experimentally. Mathematically, the product of these two relationships gives the branching index correction factor ($\Delta g_M$) as a function of MW, as shown in equation 5, $$\frac{d(\Delta g_M)}{d(M)} = \frac{d(x_{SCB})}{d(M)} \times \frac{d(\Delta g_M)}{d(x_{SCB})} \qquad (5)$$

where $x_{SCB}$ is the SCB content (i.e., number of SCB per 1,000 total carbons) of the copolymer in question.

To establish the relationship between $\Delta g_M$ and $x_{SCB}$, PE standards that met the following criteria were used: the standards contain essentially no LCB and have flat SCB distribution and known SCB contents. At least five SCB standards were used for the SCB effect correction. The SCB content for these SCB standards ranged from 0 to 34 SCB/1,000 total carbon atoms.

Short chain branch content and short chain branching distribution (SCBD) across the molecular weight distribution were determined via an IR5-detected GPC system (IR5-GPC) using the method established by Yu (Y. Yu, Macromolecular Symposium, 2020, 390, 1900014), wherein the GPC system was a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Characterisation SA, Spain) was connected to the GPC columns via a hot-transfer line. Chromatographic data was obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Extensional viscosity was measured on a rotational rheometer (Physica MCR-500, Anton Paar) using the extensional viscosity fixture, a Sentimanat Extensional Rheometer (model SER-3 universal testing platform, Xpansion Instruments). The SER attachment makes it possible to easily measure the transient extensional viscosity as a function of time.

Test samples were prepared via compression molding at 182° C. The pellets samples were allowed to melt at a relatively low pressure for 1 min and then subjected to a high molding pressure for additional 2 min. Then, the hot press was turned off for slow cooling. The cooled plaque was retrieved from the press on the following day. Rectangular strips with dimensions of 12.77×18 mm were cut out of the molded plaque, and the thickness of the sample was measured.

The SER testing platform has two drums that rotate in the opposing direction (M. L. Sentmanat, "Miniature universal testing platform: from extensional melt rheology to solid-state deformation behavior," *Rheol. Acta* 43, 657 (2004); M. L. Sentmanat, B. N. Wang, G. H. McKinley, "Measuring the transient extensional rheology of polyethylene melts using the SER universal testing platform," *J. Rheol.* 49, 585 (2005); both incorporated herein by reference in their entirety). The rectangular samples were tested by clipping onto the two posts of the fixture, then closing the oven to heat to 150° C., where it was annealed at 150° C. for 30 sec to allow the temperature to reach equilibrium. The sample was then stretched at constant Hencky strain rates $\dot{\varepsilon}_H$ between 0.03 and 25 s$^{-1}$ at 150° C. The torque M resulting from the force of tangential stretching of the sample between the rotating drums F was recorded by the rotational rheometer:

$$M(t) = 2RF(t) \tag{A}$$

where the radius of drums R=5.155 mm. The Hencky strain rate $\dot{\varepsilon}_H$ at constant drum rotating speed $\Omega$ is $$\dot{\varepsilon}_H = \frac{2\Omega R}{L} \tag{B}$$

where the length of the stretching zone between the rotating drums L=12.72 mm. The transient extensional viscosity $\eta_E^*(t)$ was obtained for given Hencky strain rate as $$\eta_E^+(t) = \frac{\sigma_E(t)}{\dot{\varepsilon}_E} = \frac{F(t)}{A(t,T)\dot{\varepsilon}_E} \tag{C}$$

where A(t,T) is the cross-sectional area of the sample which thermally expands upon melting and exponentially decreases with stretching:

$$A(t, T) = A_o \exp(-\dot{\varepsilon}_E t)\left(\frac{\rho_s}{\rho(T)}\right)^{2/3} \tag{D}$$

where $A_0$ and $\rho_s$ are the initial cross-sectional area and the density of the sample measured at room temperature in solid state. The melt density $\rho(T)$ is given by $\rho(T)=\rho_0-\Delta\rho(T-273.15)T$. Therefore, the transient extensional viscosity $\eta_E^*(t)$ as a function of time was calculated at each extension rate as $$\eta_E^+(t) = \frac{M - M_{offset}}{2R\dot{\varepsilon}_E A_0 \exp(-\dot{\varepsilon}_E t)}\left(\frac{\rho(T)}{\rho_s}\right)^{2/3} \tag{E}$$

where $M_{offset}$ is a pre-set torque which can be applied prior to the actual test. To compare the extensional response to the linear viscoelastic (LVE) limit, the LVE envelop $3\eta^+(t)$ was obtained from the relaxation spectrum of the dynamic frequency sweep data measured at 150° C. as $$\eta^+(t) = \sum_{i=1}^{N} G_i \lambda_i [1 - \exp(-t/\lambda_i)] \tag{F}$$

where the set of $G_i$ and $\lambda_i$ define the relaxation spectrum of the material.

In general, it has been observed that when long chain branching exists in the polymer, the transient extensional viscosity deviates from the LVE drastically by increasing slope just before breakage. This behavior is called the strain hardening. In contrast, for linear resins the transient extensional viscosity growth curves show no strain hardening by continuing to follow the LVE envelop ($3\eta^+(t)$) according to the Trouton's rule.

Metals content, such as the amount of catalyst residue in the ethylene polymer or the article of manufacture (on a ppm basis), can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Fluorided silica-coated alumina activator-supports (FSCA) used in Examples 1-2 were prepared as follows.

Bohemite was obtained from W.R. Grace & Company under the designation "Alumina A" and having a surface area of 300 m²/g, a pore volume of 1.3 mL/g, and an average particle size of 100 microns. The alumina was first calcined in dry air at about 600° C. for approximately 6 hours, cooled to ambient temperature, and then contacted with tetraethyl-orthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina (FSCA) was collected and stored under dry nitrogen, and was used without exposure to the atmosphere.

Pilot plant polymerizations were conducted in a 30-gallon slurry loop reactor at a production rate of approximately 30 pounds of polymer per hour. Polymerization runs were carried out under continuous particle form process conditions in a loop reactor (also referred to as a slurry process) by contacting separate metallocene solutions, an organoaluminum solution (triisobutylaluminum, TIBA), and an activator-support (fluorided silica-coated alumina, FSCA) in a 1-L stirred autoclave (30 min residence time) with output to the loop reactor.

Ethylene used was polymerization grade ethylene which was purified through a column of AZ 300 (activated at 300-500° F. in nitrogen). 1-Hexene was polymerization grade 1-hexene (obtained from Chevron Phillips Chemical Company) which was purified by nitrogen purging and storage over AZ 300 activated at 300-500° F. in nitrogen. Liquid isobutane was used as the diluent.

Certain polymerization conditions for Examples 1-2 are provided in Table I below (mole % ethylene and ppm by weight of triisobutylaluminum (TIBA) are based on isobutane diluent). The polymerization conditions also included a reactor pressure of 590 psig, a polymerization temperature of 97° C., a feed rate of 30 lb/hr ethylene, and 2.5-3.5 ppm total of MET 1 and MET 2 (based on the weight of isobutane diluent). The structures for MET 1 and MET 2, used in Examples 1-2, are shown below:

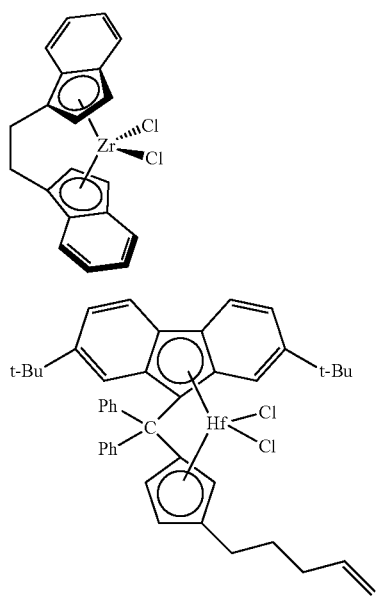

MET 1

MET 2

TABLE I

| Example | 1-Hexene (lb/hr) | $H_2$ (lb/hr) | Weight ratio MET 1/MET 2 | $C_2H_4$ mole % | TIBA ppm |
|---|---|---|---|---|---|
| 1 | 0.16 | 0.0021 | 1.88 | 11.73 | 143 |
| 2 | 0.15 | 0.0020 | 2.01 | 12.22 | 144 |

Blow molded 1-gallon containers were produced under suitable conditions on a Uniloy reciprocating blow molding machine. The parison was extruded using a 2.5" diverging die and then blown into a mold to produce the 1-gallon containers weighing approximately 105 g at the following set of process controls: 360° F. extruder temperature; 2.1-2.2 shot size; 160 g total parison weight; 45 rpm screw speed; 200 (±15) psig back pressure. Drop impact testing was performed on the 1-gallon containers that were blow molded from the polymers of Examples 1-3, generally in accordance with ASTM D2463.

Examples 1-4

Comparative Example 3 was a commercially-available chromium-catalyzed ethylene/1-hexene copolymer resin from Chevron-Phillips Chemical Company LP, and Comparative Example 4 was a linear dual-metallocene blow molding resin (with no long chain branching).

For the polymers of Examples 1-3, Table II summarizes various molecular weight, LCB (Janzen-Colby), rheology, melt index, density, ESCR, and blow molded bottle properties, while Table III summarizes an extrusion and blow molding processing comparison, and FIG. 1 illustrates the molecular weight distribution curves (amount of polymer versus the logarithm of molecular weight) for the polymers of Examples 1-3. As compared to chromium-based Example 3, the ethylene/1-hexene copolymers of Examples 1-2 had less LCBs per million total carbon atoms (via Janzen-Colby), lower relaxations times, higher CY-a parameters, and significantly better ESCR properties.

Figure 10:
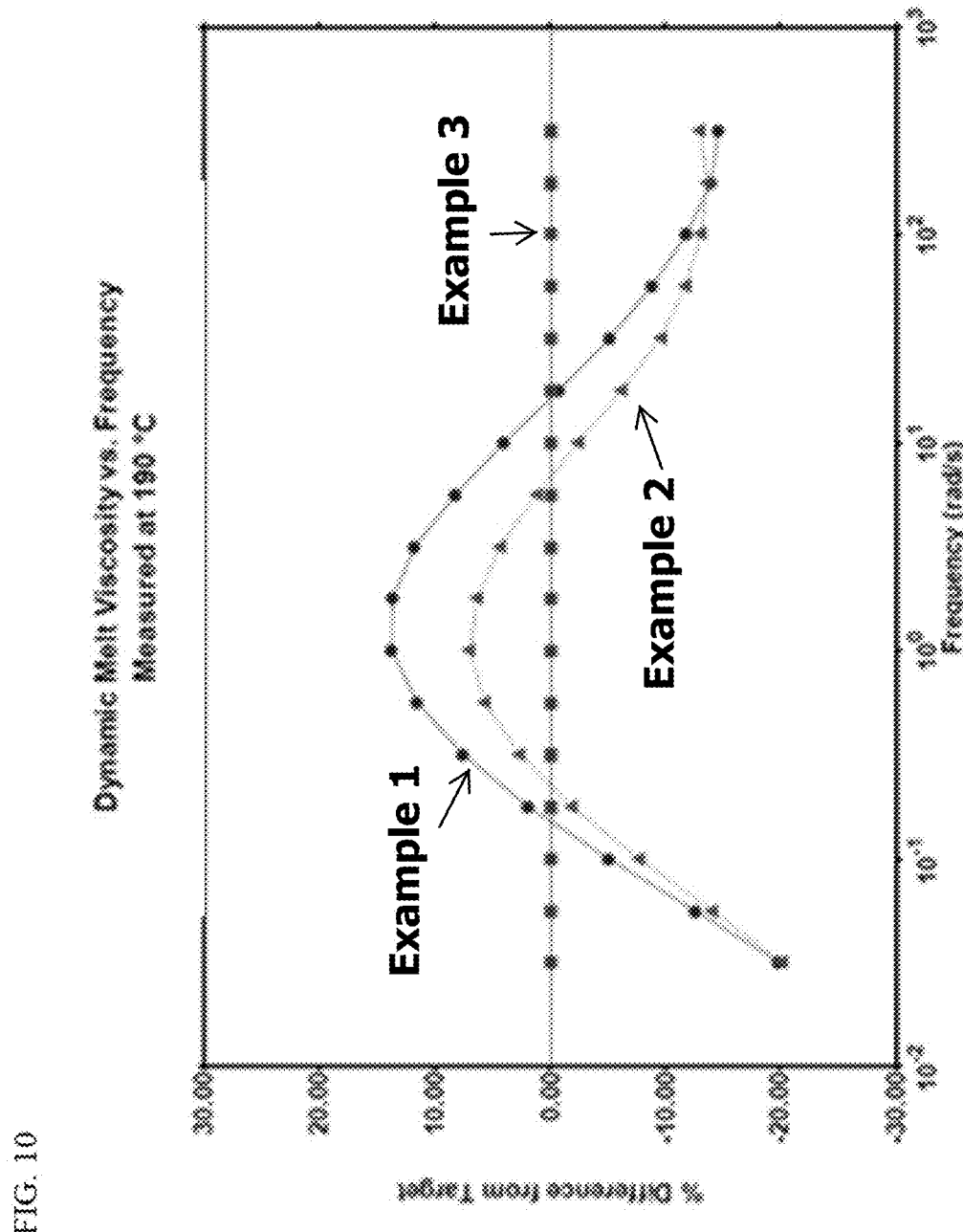
FIG. 10 presents a dynamic rheology plot that compares the viscosities of the polymers of Examples 1-2 to that of the polymer of Comparative Example 3.

Using the chromium polymer of Example 3 as a benchmark, Table III shows that the polymers of Examples 1-2 had unexpectedly lower extrusion pressure (psi) and equivalent part weights, cycle times, layflats, and output rates (measured at 100 rpm with a 0.022" die gap). The processing similarities are also shown by the relatively small rheology differences between Examples 2-3 and Comparative Example 1 in FIG. 10.

Figure 2:
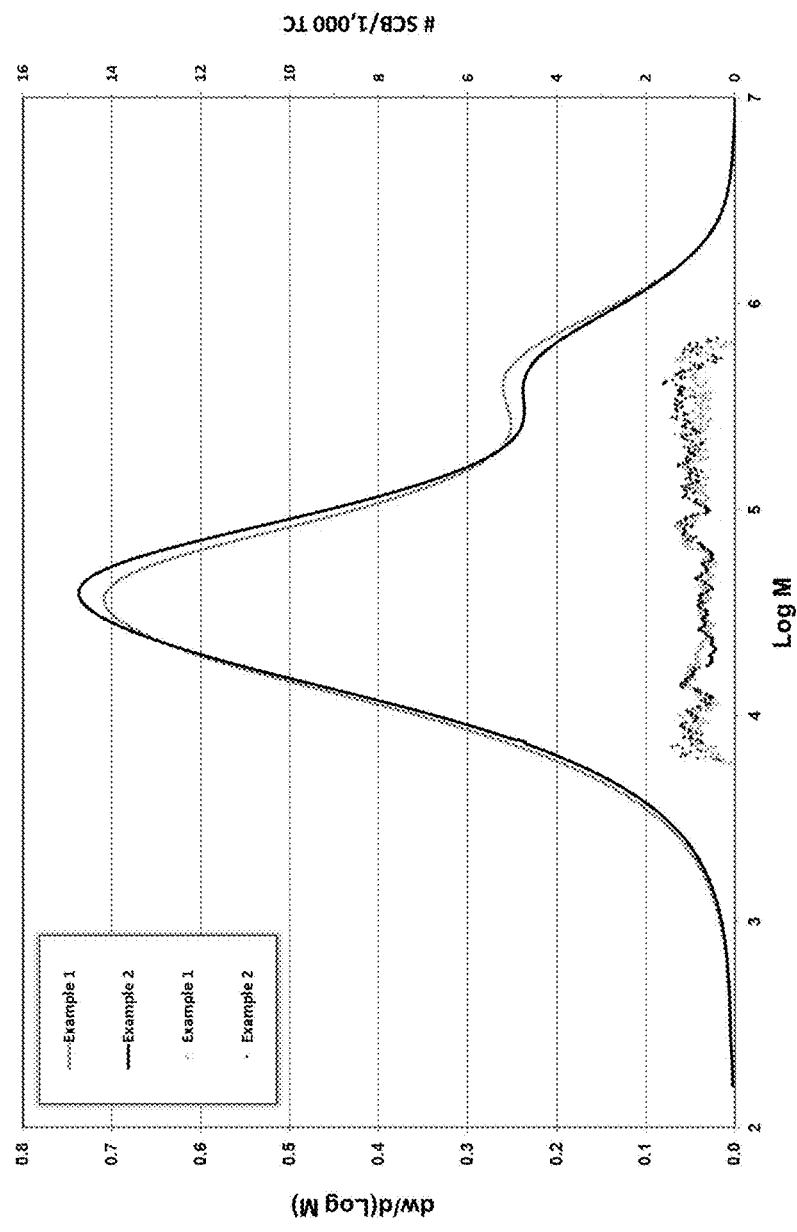
FIG. 2 presents a plot of the short chain branch distributions across the molecular weight distributions of the polymers of Example 1-2.

FIG. 2 illustrates the short chain branch distributions for the polymers of Examples 1-2. Surprisingly, these polymers have a substantially flat SCBD, in which the SCB content is generally constant with increasing molecular weight.

Figure 3:
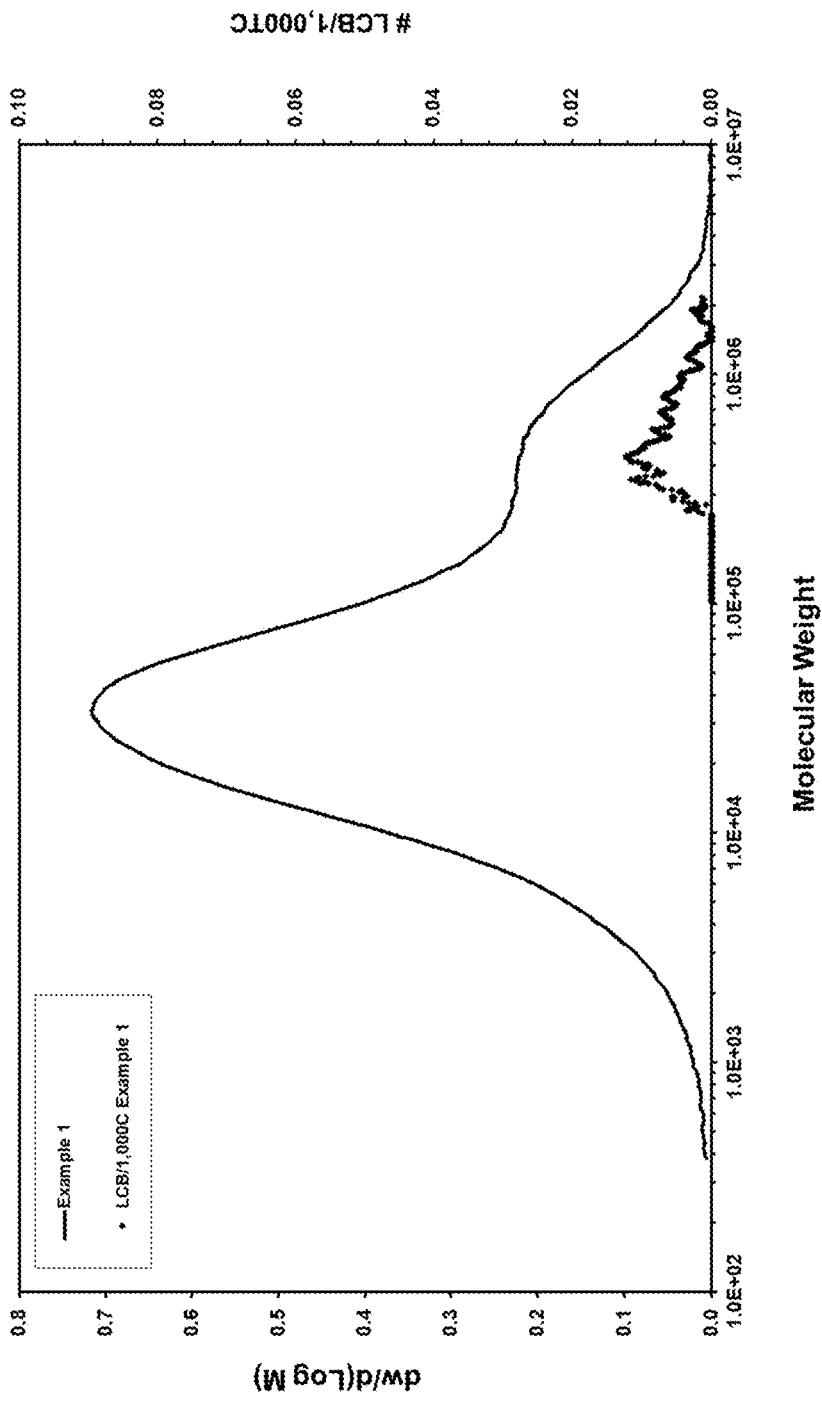
FIG. 3 presents a plot of the long chain branch distribution across the molecular weight distribution of the polymer of Example 1.
Figure 4:
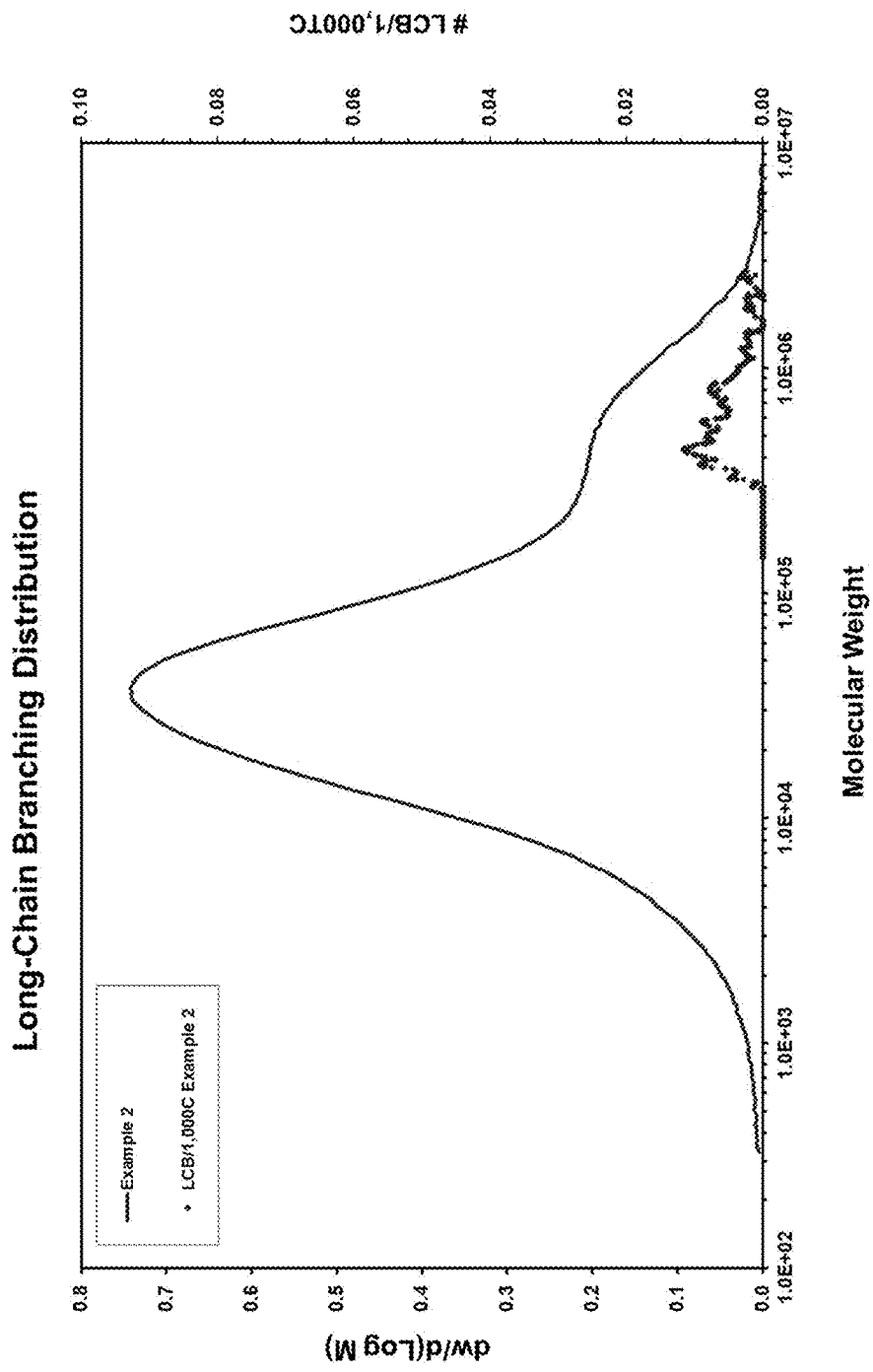
FIG. 4 presents a plot of the long chain branch distribution across the molecular weight distribution of the polymer of Example 2.
Figure 5:
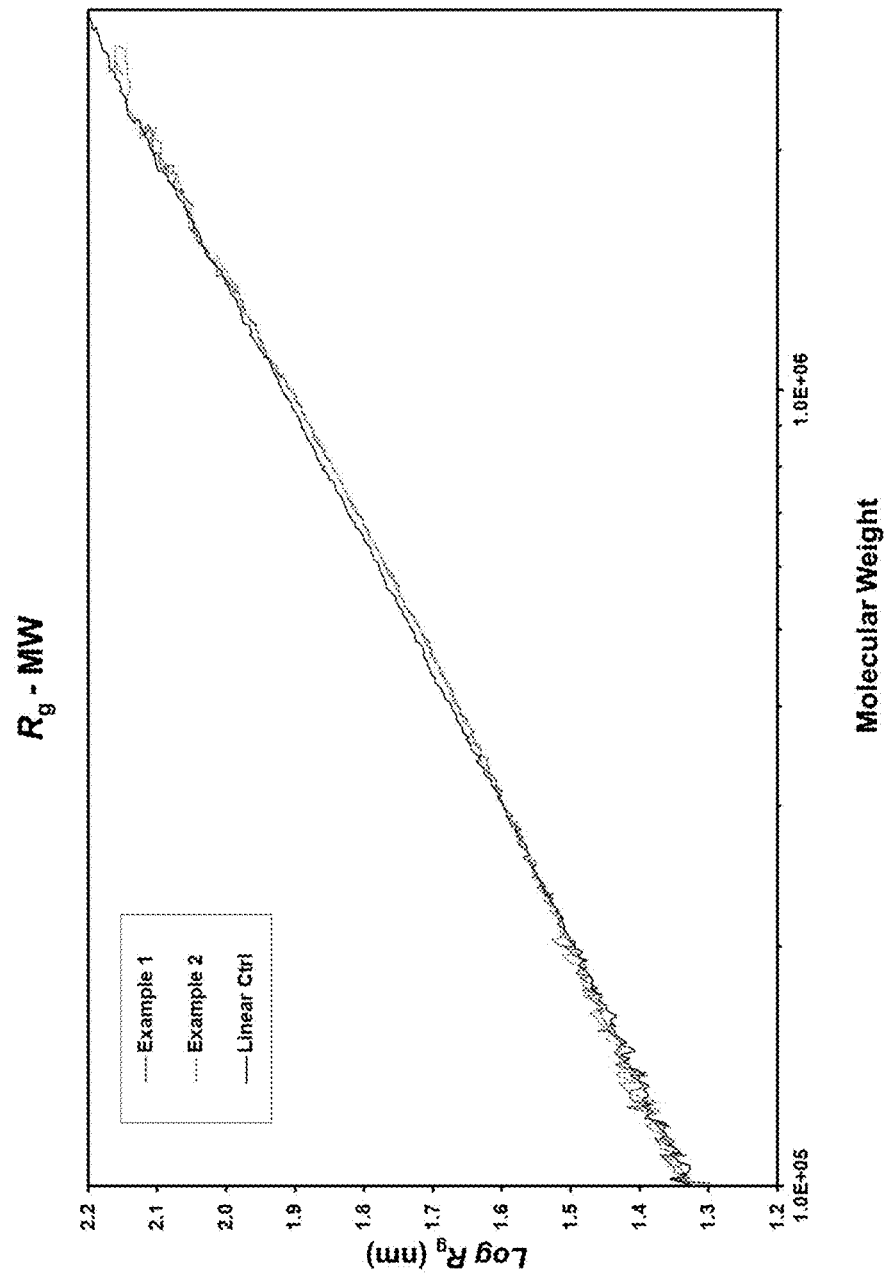
FIG. 5 presents a plot of the radius of gyration versus the molecular weight for a linear standard and the polymers of Examples 1-2.

FIG. 3 illustrates a plot of the molecular weight distribution and long chain branch distribution of the polymer of Example 1, while FIG. 4 illustrates a plot of the molecular weight distribution and long chain branch distribution of the polymer of Example 2. The concentration of long chain branch content in the ~300,000-900,000 g/mol molecular weight range (but not in the very high molecular weight fraction) of the inventive polymers of Examples 1-2 is illustrated in these figures. Further, FIG. 5 illustrates a plot of the radius of gyration versus the molecular weight for a linear standard and the polymers of Examples 1-2, and demonstrates the deviation of the polymers of Examples 1-2 from the linear standard, due to the presence of LCB in the ~300,000-900,000 g/mol range. From FIGS. 3-4, Table IV summarizes the LCB content of the respective ethylene polymers in certain molecular weight ranges.

As an example, the number-average number of LCBs per 1,000,000 total carbon atoms of the respective polymers in FIGS. 3-4 in the molecular weight range of 300,000 to 900,000 g/mol and in the molecular weight range of 1,000,000 to 2,000,000 g/mol can be calculated based on Equations I and II, respectively, and are summarized in Table IV.

$$\tilde{\lambda} = \frac{\sum_{MW=300\,kg/mol}^{MW=900\,kg/mol} \lambda_i \left(\frac{dw}{d(\text{Log } M)}\right)_i (d(\text{Log } M))_i}{\sum_{MW=300\,kg/mol}^{MW=900\,kg/mol} \left(\frac{dw}{d(\text{Log } M)}\right)_i (d(\text{Log } M))_i} \quad \text{Equation I}$$

$$\tilde{\lambda} = \frac{\sum_{MW=1000\,kg/mol}^{MW=2000\,kg/mol} \lambda_i \left(\frac{dw}{d(\text{Log } M)}\right)_i (d(\text{Log } M))_i}{\sum_{MW=1000\,kg/mol}^{MW=2000\,kg/mol} \left(\frac{dw}{d(\text{Log } M)}\right)_i (d(\text{Log } M))_i} \quad \text{Equation II}$$

where $\tilde{\lambda}$ is the number-average LCB number in the respective molecular weight range and $\lambda_i$ is LCB at slice i. As shown in Table IV, the number-average number of LCBs per 1,000,000 total carbon atoms of the polymers in FIGS. 3-4 in the molecular weight range of 300,000 to 900,000 g/mol (or 400,000 to 600,000 g/mol) is significantly—and unexpectedly—greater than that in the molecular weight range of 1,000,000 to 2,000,000 g/mol.

Figure 6:
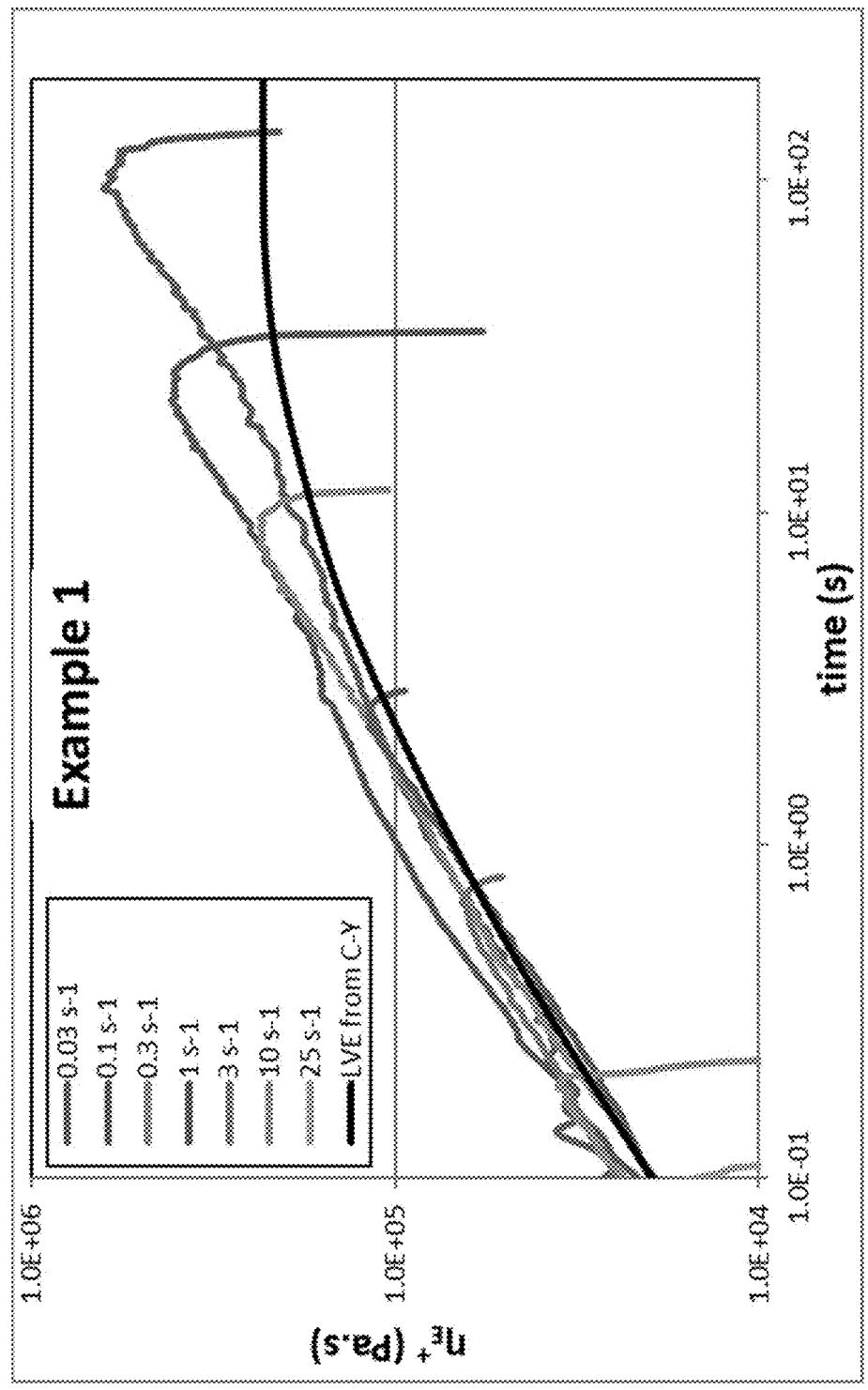
FIG. 6 presents an extensional viscosity plot (extensional viscosity versus time) for the polymer of Example 1.
Figure 7:
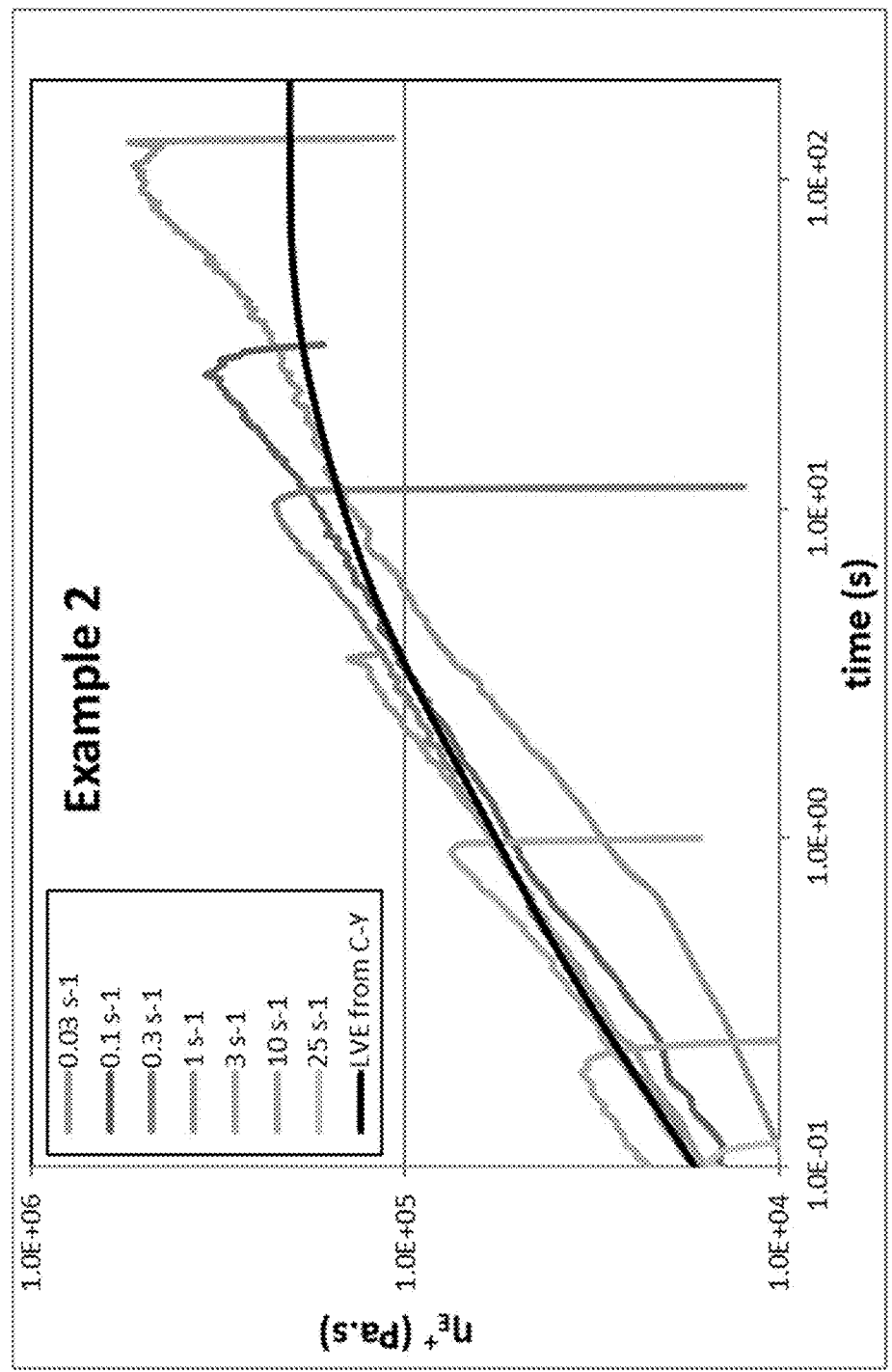
FIG. 7 presents an extensional viscosity plot (extensional viscosity versus time) for the polymer of Example 2.
Figure 8:
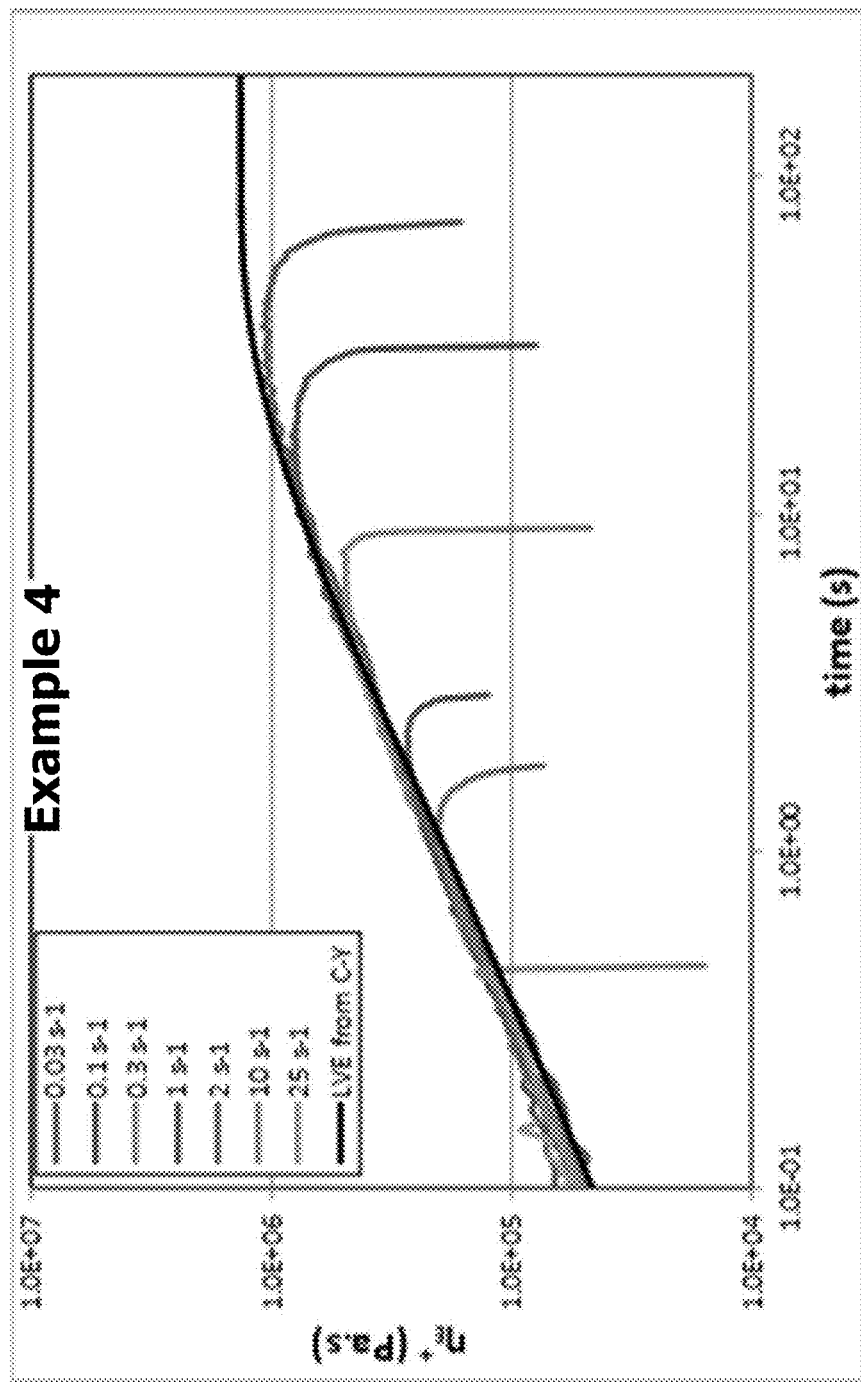
FIG. 8 presents an extensional viscosity plot (extensional viscosity versus time) for the polymer of Comparative Example 4.
Figure 9:
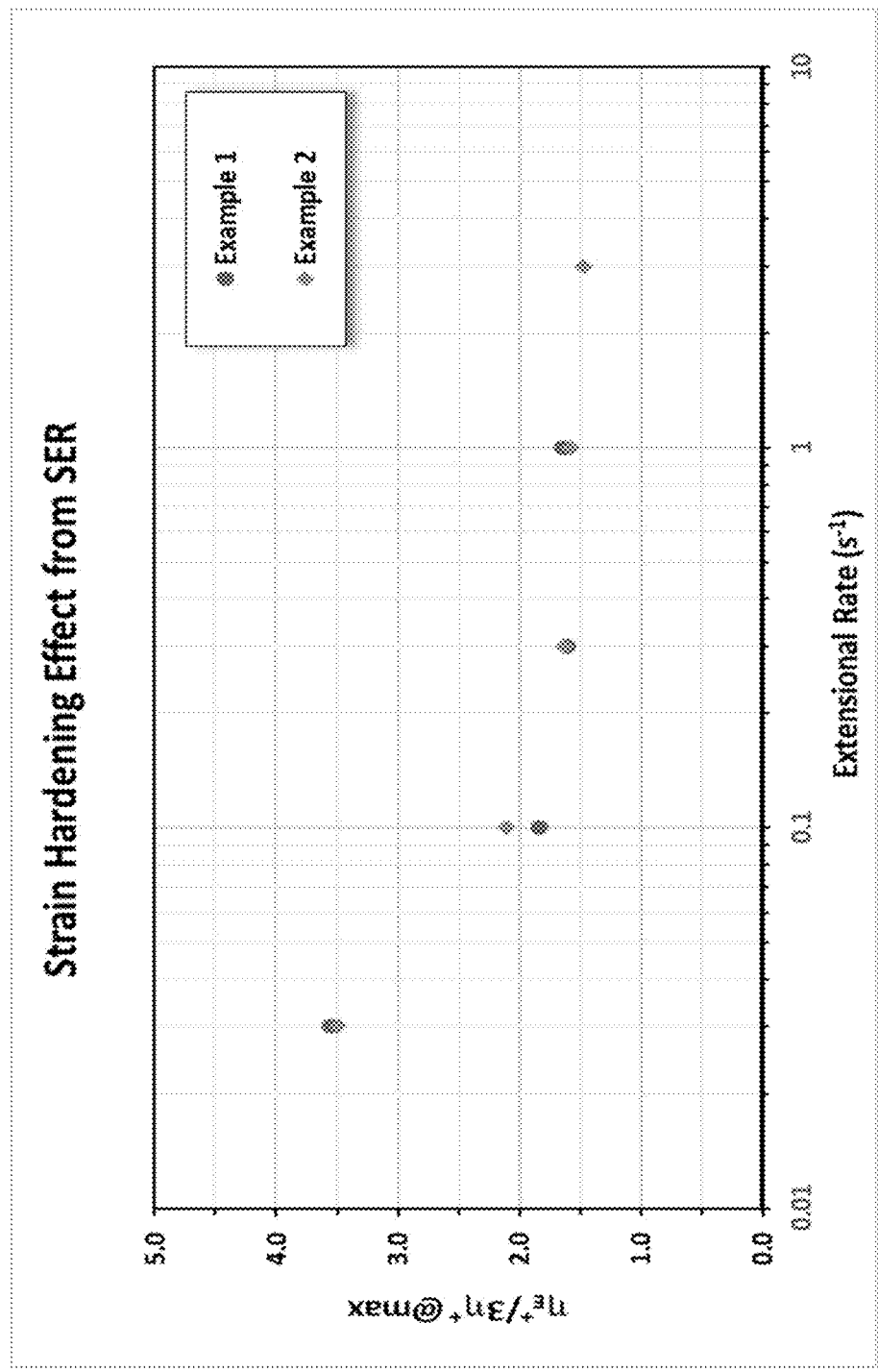
FIG. 9 presents a plot of the maximum ratio of $\eta_E/3\eta$ at extensional rates in the 0.03 to 10 sec$^{-1}$ range for the polymers of Examples 1-2.

FIGS. 6-8 illustrates extensional viscosity plots, respectively, for the polymers of Example 1, Example 2, and Comparative Example 4. Extensional rheology was used as a means to quantify the amount of LCBs, since for a Newtonian fluid, the ratio of extensional viscosity will be equal to 3 times the shear viscosity; the ratio of $\eta_E/3\eta$ will be equal to 1 for a Newtonian fluid (see the linear polymer of Comparative Example 4 in FIG. 8, with no long chain branching). For molten polymers with strain hardening due to the presence of LCBs, the ratio of $\eta_E/3\eta$ will be greater than 1. FIGS. 6-7 are extensional viscosity plots at for the polymers of Examples 1-2, determined using SER. The minor scatter in the baseline was due to the limited amount of samples for the SER experiments. From FIGS. 6-7, FIG. 9 was prepared to summarize the maximum ratio of $\eta_E/3\eta$ at extensional rates in the 0.03 to 10 $\sec^{-1}$ range for the polymers of Examples 1-2. A higher ratio equates to more strain hardening, and therefore, higher levels of LCBs. For these inventive polymers, unexpectedly, the maximum ratio of $\eta_E/3\eta$ at the extensional rate of 0.03 $\sec^{-1}$ ranged from 3 to 4, and ranged from 1.5 to 2.5 at an extensional rate of 0.1 $\sec^{-1}$.

While not wishing to be bound by theory, higher levels of LCB—and thus higher extensional viscosity—can be obtained herein by decreasing the concentration of ethylene in the reactor. Additionally or alternatively, increasing comonomer levels (e.g., more 1-hexene) for a given ethylene concentration (the ratio of [1-hexene]/[ethylene]) can be used to increase levels of LCB in the polymer. Levels of LCB also can be adjusted by varying the ratio of the metallocene compounds in the catalyst system.

Thus, the ethylene copolymers disclosed herein offer a beneficial combination of density, melt flow, molecular weight, relaxation time, long chain branching, and extensional rheology properties, resulting in processability comparable to chromium-based polymers, but with improved ESCR and toughness properties.

TABLE II

| Example | Mn/1000 (g/mol) | Mw/1000 (g/mol) | Mz/1000 (g/mol) | Mp/1000 (g/mol) | Mw/Mn | Mz/Mw | LCB/million carbon atoms |
|---|---|---|---|---|---|---|---|
| 1 | 18.3 | 156 | 783 | 40.2 | 8.52 | 5.02 | 8.2 |
| 2 | 18.7 | 149 | 740 | 44.5 | 8.03 | 4.97 | 10.9 |
| 3 | 20.7 | 134 | 635 | 52.5 | 6.47 | 4.74 | 37 |

| Example | $\eta_0$ (Pa-sec) | $\tau_\eta$ (sec) | CY-a | $\eta$ @ 0.1 sec (Pa-sec) | $\eta$ @ 100 sec (Pa-sec) | $\eta$ @ 0.1/ $\eta$ @ 100 | $\eta$ @ HLMI (Pa-sec) |
|---|---|---|---|---|---|---|---|
| 1 | 1.02E+05 | 1.2 | 0.31 | 33710 | 1181 | 28.5 | 367 |
| 2 | 1.40E+05 | 1.4 | 0.26 | 32780 | 1165 | 28.1 | 401 |
| 3 | 1.43E+06 | 3.7 | 0.14 | 35480 | 1318 | 26.9 | 757 |

| Example | HLMI (g/10 min) | MI (g/10 min) | Density (g/cc) | Bent Strip ESCR (hr) | Yield Strength (psi) | Bottle ESCR (hr) | Bottle Topload (lb) | Bottle Drop Impact (ft) |
|---|---|---|---|---|---|---|---|---|
| 1 | 45 | 0.30 | 0.9583 | 115 | 4260 | 499 | 175 | >12 |
| 2 | 50 | 0.36 | 0.9581 | 79 | 4310 | — | — | — |
| 3 | 32 | 0.33 | 0.9556 | <50 | 4130 | 165 | 175 | 11.9 |

TABLE III

| Example | Melt Temp. (° F.) | Weight Setting (%) | Die Gap (in) | Parison Weight (g) | Part Weight (g) | Screw Charge (sec) | Cycle Time (sec) | Head Pressure (psi) | Top Layflat (in) | Bottom Layflat (in) | Output (g/min) | Melt Strength (sec) |
|---|---|---|---|---|---|---|---|---|---|---|---|---|
| 1 | 411 | 1.2 | 0.015 | 160.8 | 105.5 | 15.3 | 17.0 | 4450 | 5.52 | 5.79 | 1295 | 14.3 |
| 2 | 405 | 0 | 0.013 | 161.5 | 109.6 | 15.2 | 16.9 | 4600 | 5.46 | 5.70 | 1297 | 14.7 |
| 3 | 416 | 1.2 | 0.015 | 160.2 | 105.1 | 14.6 | 16.3 | 5040 | 5.22 | 5.55 | 1302 | 31.5 |

TABLE IV

| Average LCBs per 1,000,000 total carbon atoms | Example 1 | Example 2 |
|---|---|---|
| (a) 300,000-900,000 g/mol range | 7.83 | 6.66 |
| (b) 1,000,000-2,000,00 g/mol range | 1.89 | 2.45 |
| Percentage (a)/(b) | 414% | 272% |
| (a) 400,000-600,000 g/mol range | 8.98 | 8.32 |
| (b) 1,000,000-2,000,000 g/mol range | 1.89 | 2.45 |
| Percentage (a)/(b) | 475% | 340% |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having:
a melt index of less than or equal to about 1 g/10 min;
a density in a range from about 0.94 to about 0.965 g/cm³;
a Mw in a range from about 100,000 to about 250,000 g/mol;
a relaxation time from about 0.5 to about 3 sec; and
an average number of long chain branches (LCBs) per 1,000,000 total carbon atoms of the polymer in a molecular weight range of 300,000 to 900,000 g/mol that is greater (by any amount disclosed herein, e.g., at least 50%, at least 75%, at least 100%, at least 150%, at least 200%, etc.) than that in a molecular weight range of 1,000,000 to 2,000,000 g/mol.

Aspect 2. An ethylene polymer having:
a melt index of less than or equal to about 1 g/10 min;
a density in a range from about 0.94 to about 0.965 g/cm³;
a Mw in a range from about 100,000 to about 250,000 g/mol;
a relaxation time from about 0.5 to about 3 sec;
an average number of long chain branches (LCBs) per 1,000,000 total carbon atoms of the polymer in a molecular weight range of 1,000,000 to 2,000,000 g/mol of less than or equal to about 5; and
a maximum ratio of >E/3η at an extensional rate of 0.1 sec$^{-1}$ in a range from about 1.2 to about 10.

Aspect 3. The polymer defined in aspect 1 or 2, wherein the ethylene polymer has a melt index (MI) in any range disclosed herein, e.g., less than or equal to about 0.7 g/10 nm, less than or equal to about 0.5 g/10 min, from about 0.1 to about 0.5 g/10 min, from about 0.2 to about 0.4 g/10 min, etc.

Aspect 4. The polymer defined in any one of the preceding aspects, wherein the ethylene polymer has a high load melt index (HLMI) in any range disclosed herein, e.g., from about 10 to about 65 g/10 min, from about 35 to about 55 g/10 min, from about 20 to about 60 g/10 min, from about 40 to about 55 g/10 min, etc.

Aspect 5. The polymer defined in any one of the preceding aspects, wherein the ethylene polymer has a ratio of HLMI/MI in any range disclosed herein, e.g., from about 100 to about 200, from about 120 to about 170, from about 130 to about 160, etc.

Aspect 6. The polymer defined in any one of the preceding aspects, wherein the ethylene polymer has a density in any range disclosed herein, e.g., from about 0.942 to about 0.965 g/cm³, from about 0.94 to about 0.96 g/cm³, from about 0.95 to about 0.965 g/cm³, from about 0.955 to about 0.962 g/cm³, from about 0.955 to about 0.96 g/cm³, etc.

Aspect 7. The polymer defined in any one of the preceding aspects, wherein the ethylene polymer has a ratio of Mw/Mn in any range disclosed herein, e.g., from about 5 to about 15, from about 6 to about 12, from about 6 to about 10, from about 7 to about 10, etc.

Aspect 8. The polymer defined in any one of the preceding aspects, wherein the ethylene polymer has a ratio of Mz/Mw in any range disclosed herein, e.g., from about 3.5 to about 10, from about 4 to about 8, from about 4 to about 6, from about 4.5 to about 5.5, etc.

Aspect 9. The polymer defined in any one of the preceding aspects, wherein the ethylene polymer has a Mz in any range disclosed herein, e.g., from about 500,000 to about 2,000,000 g/mol, from about 600,000 to about 1,200,000 g/mol, from about 650,000 to about 1,000,000 g/mol, from about 700,000 to about 900,000 g/mol, etc.

Aspect 10. The polymer defined in any one of the preceding aspects, wherein the ethylene polymer has a Mw in any range disclosed herein, e.g., from about 125,000 to about 250,000 g/mol, from about 100,000 to about 200,000 g/mol, from about 110,000 to about 190,000 g/mol, from about 125,000 to about 175,000 g/mol, etc.

Aspect 11. The polymer defined in any one of the preceding aspects, wherein the ethylene polymer has a Mn in any range disclosed herein, e.g., from about 10,000 to about 30,000 g/mol, from about 10,000 to about 25,000 g/mol, from about 15,000 to about 25,000 g/mol, from about 15,000 to about 20,000 g/mol, etc.

Aspect 12. The polymer defined in any one of the preceding aspects, wherein the ethylene polymer has an average number of long chain branches (LCBs) per 1,000,000 total carbon atoms of the polymer in a molecular weight range of 300,000 to 900,000 g/mol in any range disclosed herein, e.g., from 3 to about to 15, from about 4 to about 10, from about 5 to about 9, from about 6 to about 8, etc.

Aspect 13. The polymer defined in any one of the preceding aspects, wherein the ethylene polymer has an average number of long chain branches (LCBs) per 1,000,000 total carbon atoms of the polymer in a molecular weight range of 400,000 to 600,000 g/mol in any range disclosed herein, e.g., from 4 to about 15, from about 5 to about 12, from about 7 to about 10, from about 8 to about 9, etc.

Aspect 14. The polymer defined in any one of the preceding aspects, wherein the ethylene polymer has an average number of long chain branches (LCBs) per 1,000,000 total carbon atoms of the polymer in a molecular weight range of 1,000,000 to 2,000,000 g/mol in any range disclosed herein, e.g., less than or equal to about 5, less than or equal to about 4, less than or equal to about 3.5, less than or equal to about 3, etc.

Aspect 15. The polymer defined in any one of the preceding aspects, wherein the ethylene polymer contains from about 5 to about 15 LCBs, from about 6 to about 14 LCBs, from about 8 to about 12 LCBs, etc., per 1,000,000 total carbon atoms.

Aspect 16. The polymer defined in any one of the preceding aspects, wherein the ethylene polymer has a maximum ratio of $\eta_E/3\eta$ at an extensional rate of 0.1 sec$^{-1}$ in any range disclosed herein, e.g., from about 1.2 to about 10, from about 1.5 to about 8, from about 1.5 to about 5, from about 1.2 to about 4, from about 1.2 to about 3, from about 1.4 to about 3.5, from about 1.4 to about 3, from about 1.5 to about 2.5, etc.

Aspect 17. The polymer defined in any one of the preceding aspects, wherein the ethylene polymer has a maximum ratio of $\eta_E/3\eta$ at an extensional rate of 0.03 sec$^{-1}$ in any range disclosed herein, e.g., from about 1.2 to about 10, from about 1.5 to about 8, from about 2 to about 7, from about 2 to about 5, from about 2.5 to about 4.5, from about 3 to about 4, etc.

Aspect 18. The polymer defined in any one of the preceding aspects, wherein the ethylene polymer has a CY-a parameter in any range disclosed herein, e.g., from about 0.15 to about 0.45, from about 0.2 to about 0.4, from about 0.22 to about 0.35, from about 0.22 to about 0.32, etc.

Aspect 19. The polymer defined in any one of the preceding aspects, wherein the ethylene polymer has a zero-shear viscosity in any range disclosed herein, e.g., from about $1 \times 10^3$ to about $1 \times 10^8$ Pa-sec, from about $1 \times 10^4$ to about $1 \times 10^7$ Pa-sec, from about $1 \times 10^4$ to about $1 \times 10^6$ Pa-sec, etc.

Aspect 20. The polymer defined in any one of the preceding aspects, wherein the ethylene polymer has a relaxation time in any range disclosed herein, e.g., from about 0.75 to about 2.5 sec, from about 1 to about 2 sec, from about 1 to about 1.5 sec, etc.

Aspect 21. The polymer defined in any one of the preceding aspects, wherein the ethylene polymer has a viscosity at 100 sec$^{-1}$ (eta @ 100 or η@ 100) in any range disclosed herein, e.g., from about 750 to about 1750, from about 850 to about 1300, from about 1000 to about 1500, from about 1000 to about 1300 Pa-sec, etc.

Aspect 22. The polymer defined in any one of the preceding aspects, wherein the ethylene polymer has a viscosity at HLMI (eta @ HLMI or η@ HLMI) in any range disclosed herein, e.g., from about 300 to about 750, from about 300 to about 500, from about 300 to about 450, from about 350 to about 450 Pa-sec, etc.

Aspect 23. The polymer defined in any one of the preceding aspects, wherein the ethylene polymer has a ratio of η@ 0.1/η@ 100 in any range disclosed herein, e.g., from about 20 to about 45, from about 20 to about 35, from about 22 to about 32, from about 25 to about 30, etc.

Aspect 24. The polymer defined in any one of the preceding aspects, wherein the ethylene polymer has a substantially constant number of short chain branches (SCBs) per 1000 total carbon atoms, or a substantially flat SCBD (short chain branching distribution).

Aspect 25. The polymer defined in any one of the preceding aspects, wherein the ethylene polymer has a part weight in any range disclosed herein, e.g., from about 95 to about 115, from about 100 to about 115, from about 95 to about 110, from about 100 to about 110 g, etc.

Aspect 26. The polymer defined in any one of the preceding aspects, wherein the ethylene polymer has a layflat (top) in any range disclosed herein, e.g., from about 5.2 to about 6, from about 5 to about 5.7, from about 5.2 to about 5.7 inches, etc.

Aspect 27. The polymer defined in any one of the preceding aspects, wherein the ethylene polymer has a cycle time in any range disclosed herein, e.g., from about 13 to about 20, from about 14 to about 19, from about 15 to about 18, from about 16 to about 17 seconds, etc.

Aspect 28. The polymer defined in any one of the preceding aspects, wherein the ethylene polymer has an environmental stress crack resistance (ESCR—bottle in 10% Igepal, 140° F., ASTM D2561) in any range disclosed herein, e.g., at least 200 hours, at least 250 hours, at least 300 hours, at least 400 hours, at least 500 hours, etc.

Aspect 29. The polymer defined in any one of the preceding aspects, wherein the ethylene polymer has an environmental stress crack resistance (ESCR—bent strip in 10% Igepal, 50° C., 75 mils, ASTM D1693) in any range disclosed herein, e.g., at least 50 hours, at least 60 hours, at least 75 hours, at least 85 hours, at least 100 hours, etc.

Aspect 30. The polymer defined in any one of the preceding aspects, wherein the ethylene polymer contains, independently, less than 0.1 ppm (by weight), less than 0.08 ppm, less than 0.05 ppm, less than 0.03 ppm, etc., of chromium and titanium.

Aspect 31. The polymer defined in any one of the preceding aspects, wherein the polymer further comprises any additive disclosed herein, e.g., an antioxidant, an acid scavenger, an antiblock additive, a slip additive, a colorant, a filler, a polymer processing aid, a UV additive, etc., or combinations thereof.

Aspect 32. The polymer defined in any one of the preceding aspects, wherein the ethylene polymer has a bimodal molecular weight distribution.

Aspect 33. The polymer defined in any one of the preceding aspects, wherein the ethylene polymer is a single reactor product, e.g., not a post-reactor blend of two polymers, for instance, having different molecular weight characteristics.

Aspect 34. The polymer defined in any one of the preceding aspects, wherein the ethylene polymer comprises an ethylene/α-olefin copolymer and/or an ethylene homopolymer.

Aspect 35. The polymer defined in any one of the preceding aspects, wherein the ethylene polymer comprises an ethylene/1-butene copolymer, an ethylene/1-hexene copolymer, an ethylene/1-octene copolymer, an ethylene homopolymer, or any combination thereof.

Aspect 36. The polymer defined in any one of the preceding aspects, wherein the ethylene polymer comprises an ethylene/1-hexene copolymer.

Aspect 37. An article (e.g., a blow molded product) comprising the ethylene polymer defined in any one of aspects 1-36.

Aspect 38. An article comprising the ethylene polymer defined in any one of aspects 1-36, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 39. A catalyst composition comprising:

catalyst component I comprising any single atom bridged or two atom bridged metallocene compound disclosed herein with two indenyl groups;

catalyst component II comprising any single atom bridged metallocene compound disclosed herein with a fluorenyl group and a cyclopentadienyl group, and with an alkenyl substituent on the single atom bridge and/or on the cyclopentadienyl group;

any activator disclosed herein; and optionally, any co-catalyst disclosed herein.

Aspect 40. The composition defined in aspect 39, wherein the activator comprises an activator-support, an aluminoxane compound, an organoboron or organoborate compound, an ionizing ionic compound, or any combination thereof.

Aspect 41. The composition defined in aspect 39, wherein the activator comprises an aluminoxane compound.

Aspect 42. The composition defined in aspect 39, wherein the activator comprises an organoboron or organoborate compound.

Aspect 43. The composition defined in aspect 39, wherein the activator comprises an ionizing ionic compound.

Aspect 44. The composition defined in aspect 39, wherein the activator comprises an activator-support, the activator-support comprising any solid oxide treated with any electron-withdrawing anion disclosed herein.

Aspect 45. The composition defined in aspect 39, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 46. The composition defined in aspect 39, wherein the activator comprises fluorided alumina, sulfated alumina, fluorided silica-alumina, sulfated silica-alumina, fluorided silica-coated alumina, fluorided-chlorided silica-coated alumina, sulfated silica-coated alumina, or any combination thereof.

Aspect 47. The composition defined in aspect 39, wherein the activator comprises a fluorided solid oxide and/or a sulfated solid oxide.

Aspect 48. The composition defined in any one of aspects 44-47, wherein the activator further comprises any metal or metal ion disclosed herein, e.g., zinc, nickel, vanadium, titanium, silver, copper, gallium, tin, tungsten, molybdenum, zirconium, or any combination thereof.

Aspect 49. The composition defined in any one of aspects 39-48, wherein the catalyst composition comprises a co-catalyst, e.g., any suitable co-catalyst.

Aspect 50. The composition defined in any one of aspects 39-49, wherein the co-catalyst comprises any organoaluminum compound disclosed herein.

Aspect 51. The composition defined in aspect 50, wherein the organoaluminum compound comprises trimethylaluminum, triethylaluminum, triisobutylaluminum, or a combination thereof.

Aspect 52. The composition defined in any one of aspects 44-51, wherein the catalyst composition comprises catalyst component I, catalyst component II, a solid oxide treated with an electron-withdrawing anion, and an organoaluminum compound.

Aspect 53. The composition defined in any one of aspects 39-52, wherein catalyst component I has two unsubstituted indenyl groups.

Aspect 54. The composition defined in any one of aspects 39-53, wherein catalyst component I has a single carbon or silicon bridging atom.

Aspect 55. The composition defined in aspect 54, wherein the carbon or silicon bridging atom has two substituents independently selected from H or a $C_1$ to $C_{18}$ hydrocarbyl group, e.g., a $C_1$ to $C_6$ alkyl group.

Aspect 56. The composition defined in any one of aspects 39-53, wherein catalyst component I has a two carbon atom bridge.

Aspect 57. The composition defined in any one of aspects 39-52, wherein at least one indenyl group is substituted.

Aspect 58. The composition defined in aspect 57, wherein catalyst component I has a single carbon or silicon bridging atom.

Aspect 59. The composition defined in aspect 58, wherein the carbon or silicon bridging atom has two substituents independently selected from H or a $C_1$ to $C_{18}$ hydrocarbyl group, e.g., a $C_1$ to $C_6$ alkyl group.

Aspect 60. The composition defined in any one of aspects 57-59, wherein any substituent on an indenyl group is independently selected from H or a $C_1$ to $C_{18}$ hydrocarbyl group, e.g., a $C_1$ to $C_6$ alkyl group.

Aspect 61. The composition defined in any one of aspects 39-60, wherein catalyst component I contains zirconium.

Aspect 62. The composition defined in any one of aspects 39-61, wherein catalyst component II has a single carbon or silicon bridging atom.

Aspect 63. The composition defined in aspect 62, wherein the carbon or silicon bridging atom has two substituents independently selected from H or a $C_1$ to $C_{18}$ hydrocarbyl group, e.g., a phenyl group.

Aspect 64. The composition defined in any one of aspects 39-63, wherein the fluorenyl group is substituted.

Aspect 65. The composition defined in any one of aspects 39-64, wherein the alkenyl substituent is a $C_3$ to $C_{18}$ alkenyl group, e.g., a $C_3$ to $C_8$ terminal alkenyl group.

Aspect 66. The composition defined in any one of aspects 39-65, wherein catalyst component II contains zirconium or hafnium.

Aspect 67. The composition defined in any one of aspects 44-66, wherein the catalyst composition is substantially free of aluminoxane compounds, organoboron or organoborate compounds, ionizing ionic compounds, or combinations thereof.

Aspect 68. The composition defined in any one of aspects 39-67, wherein a weight ratio of catalyst component I to catalyst component II in the catalyst composition is in any range disclosed herein, e.g., from about 10:1 to about 1:10, from about 5:1 to about 1:5, from about 1.2:1 to about 5:1, from about 1.5:1 to about 4:1, from about 1.5:1 to about 2.5:1, etc.

Aspect 69. The composition defined in any one of aspects 39-68, wherein the catalyst composition is produced by a process comprising contacting, in any order, catalyst component I, catalyst component II, and the activator.

Aspect 70. The composition defined in any one of aspects 39-68, wherein the catalyst composition is produced by a process comprising contacting, in any order, catalyst component I, catalyst component II, the activator, and the co-catalyst.

Aspect 71. The composition defined in any one of aspects 39-70, wherein a catalyst activity of the catalyst composition is in any range disclosed herein, e.g., from about 500 to about 5000, from about 750 to about 4000, from about 1000 to about 3500 grams, etc., of ethylene polymer per gram of activator-support per hour, under slurry polymerization conditions, with a triisobutylaluminum co-catalyst, using isobutane as a diluent, and with a polymerization temperature of 95° C. and a reactor pressure of 590 psig.

Aspect 72. An olefin polymerization process, the process comprising contacting the catalyst composition defined in any one of aspects 39-71 with an olefin monomer and an optional olefin comonomer in a polymerization reactor system under polymerization conditions to produce an olefin polymer.

Aspect 73. The process defined in aspect 72, wherein the olefin monomer comprises any olefin monomer disclosed herein, e.g., any $C_2$-$C_{20}$ olefin.

Aspect 74. The process defined in aspect 72 or 73, wherein the olefin monomer and the olefin comonomer independently comprise a $C_2$-$C_{20}$ alpha-olefin.

Aspect 75. The process defined in any one of aspects 72-74, wherein the olefin monomer comprises ethylene.

Aspect 76. The process defined in any one of aspects 72-75, wherein the catalyst composition is contacted with ethylene and an olefin comonomer comprising a $C_3$-$C_{10}$ alpha-olefin.

Aspect 77. The process defined in any one of aspects 72-76, wherein the catalyst composition is contacted with ethylene and an olefin comonomer comprising 1-butene, 1-hexene, 1-octene, or a mixture thereof.

Aspect 78. The process defined in any one of aspects 72-74, wherein the olefin monomer comprises propylene.

Aspect 79. The process defined in any one of aspects 72-78, wherein the polymerization reactor system comprises a batch reactor, a slurry reactor, a gas-phase reactor, a solution reactor, a high pressure reactor, a tubular reactor, an autoclave reactor, or a combination thereof.

Aspect 80. The process defined in any one of aspects 72-79, wherein the polymerization reactor system comprises a slurry reactor, a gas-phase reactor, a solution reactor, or a combination thereof.

Aspect 81. The process defined in any one of aspects 72-80, wherein the polymerization reactor system comprises a loop slurry reactor.

Aspect 82. The process defined in any one of aspects 72-81, wherein the polymerization reactor system comprises a single reactor.

Aspect 83. The process defined in any one of aspects 72-81, wherein the polymerization reactor system comprises 2 reactors.

Aspect 84. The process defined in any one of aspects 72-81, wherein the polymerization reactor system comprises more than 2 reactors.

Aspect 85. The process defined in any one of aspects 72-84, wherein the olefin polymer comprises any olefin polymer disclosed herein.

Aspect 86. The process defined in any one of aspects 72-77 and 79-85, wherein the olefin polymer comprises an ethylene homopolymer, an ethylene/1-butene copolymer, an ethylene/1-hexene copolymer, and/or an ethylene/1-octene copolymer.

Aspect 87. The process defined in any one of aspects 72-77 and 79-85, wherein the olefin polymer comprises an ethylene/1-hexene copolymer.

Aspect 88. The process defined in any one of aspects 72-74 and 78-85, wherein the olefin polymer comprises a polypropylene homopolymer or a propylene-based copolymer.

Aspect 89. The process defined in any one of aspects 72-88, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 90. The process defined in any one of aspects 72-89, wherein the polymerization conditions are substantially constant, e.g., for a particular polymer grade.

Aspect 91. The process defined in any one of aspects 72-90, wherein no hydrogen is added to the polymerization reactor system.

Aspect 92. The process defined in any one of aspects 72-90, wherein hydrogen is added to the polymerization reactor system.

Aspect 93. The process defined in any one of aspects 72-92, wherein the olefin polymer produced is defined in any one of aspects 1-36.

Aspect 94. An olefin polymer produced by the olefin polymerization process defined in any one of aspects 72-92.

Aspect 95. An ethylene polymer defined in any one of aspects 1-36 produced by the process defined in any one of aspects 72-92.

Aspect 96. An article comprising the polymer defined in any one of aspects 94-95.

Aspect 97. A method or forming or preparing an article of manufacture comprising an olefin polymer, the method comprising (i) performing the olefin polymerization process defined in any one of aspects 72-92 to produce an olefin polymer (e.g., the ethylene polymer of any one of aspects 1-36), and (ii) forming the article of manufacture comprising the olefin polymer, e.g., via any technique disclosed herein.

We claim:

1. An ethylene polymer having:
    a melt index of less than or equal to about 0.7 g/10 min;
    a density in a range from about 0.942 to about 0.965 g/cm$^3$;
    a Mw in a range from about 110,000 to about 190,000 g/mol;
    a relaxation time from about 0.75 to about 2.5 sec; and
    an average number of long chain branches (LCBs) per 1,000,000 total carbon atoms of the ethylene polymer in a molecular weight range of 300,000 to 900,000 g/mol that is at least 50% greater than that in a molecular weight range of 1,000,000 to 2,000,000 g/mol.

2. An article of manufacture comprising the ethylene polymer of claim 1.

3. The ethylene polymer of claim 1, wherein the ethylene polymer comprises an ethylene/1-butene copolymer, an ethylene/1-hexene copolymer, an ethylene/1-octene copolymer, or a combination thereof.

4. The ethylene polymer of claim 3, wherein the ethylene polymer has:
    a ratio of Mw/Mn in a range from about 6 to about 10; and
    a ratio of Mz/Mw in a range from about 4 to about 6.

5. The ethylene polymer of claim 3, wherein the ethylene polymer has:
    a CY-a parameter in a range from about 0.2 to about 0.4; and
    an environmental stress crack resistance (ESCR, ASTM D1693) of at least 60 hours.

6. The ethylene polymer of claim 1, wherein:
    the melt index is in a range from about 0.1 to about 0.5 g/10 min;
    the density is in a range from about 0.95 to about 0.965 g/cm$^3$;
    the average number of LCBs per 1,000,000 total carbon atoms of the ethylene polymer in the molecular weight range of 300,000 to 900,000 g/mol is at least 100% greater than that in the molecular weight range of 1,000,000 to 2,000,000 g/mol; and
    the ethylene polymer comprises an ethylene/1-butene copolymer, an ethylene/1-hexene copolymer, an ethylene/1-octene copolymer, or a combination thereof.

7. A blow molded product comprising the ethylene polymer of claim 6.

8. The ethylene polymer of claim 6, wherein the ethylene polymer has:
    an average number of from about 5 to about 9 LCBs per 1,000,000 total carbon atoms of the ethylene polymer in the molecular weight range of 300,000 to 900,000 g/mol; and
    an average number of from about 7 to about 10 LCBs per 1,000,000 total carbon atoms of the ethylene polymer in a molecular weight range of 400,000 to 600,000 g/mol.

9. An ethylene polymer having:
a melt index of less than or equal to about 0.7 g/10 min;
a density in a range from about 0.94 to about 0.965 g/cm$^3$;
a Mw in a range from about 100,000 to about 200,000 g/mol;
a relaxation time from about 0.5 to about 3 sec;
an average number of long chain branches (LCBs) per 1,000,000 total carbon atoms of the ethylene polymer in a molecular weight range of 1,000,000 to 2,000,000 g/mol of less than or equal to about 4; and
a maximum ratio of extensional viscosity to three times shear viscosity ($\eta_E/3\eta$) at an extensional rate of 0.1 sec$^{-1}$ in a range from about 1.2 to about 10.

10. An article of manufacture comprising the ethylene polymer of claim 9.

11. The ethylene polymer of claim 9, wherein the ethylene polymer has:
a CY-a parameter in a range from about 0.2 to about 0.4; and
an environmental stress crack resistance (ESCR, ASTM D1693) of at least 60 hours.

12. The ethylene polymer of claim 9, wherein:
the average number of LCBs per 1,000,000 total carbon atoms of the ethylene polymer in the molecular weight range of 1,000,000 to 2,000,000 g/mol is less than or equal to about 3.5; and
the maximum ratio of $\eta_E/3\eta$ at the extensional rate of 0.1 sec$^{-1}$ is in a range from about 1.5 to about 8.

13. The ethylene polymer of claim 9, wherein:
the melt index is in a range from about 0.1 to about 0.5 g/10 min;
the density is in a range from about 0.95 to about 0.96 g/cm$^3$;
the Mw is in a range from about 125,000 to about 175,000 g/mol;
the relaxation time is in a range from about 0.75 to about 2.5 sec;
the average number of LCBs per 1,000,000 total carbon atoms of the ethylene polymer in the molecular weight range of 1,000,000 to 2,000,000 g/mol is less than or equal to about 3;
the maximum ratio of $\eta_E/3\eta$ at the extensional rate of 0.1 sec$^{-1}$ is in a range from about 1.2 to about 4; and
the ethylene polymer comprises an ethylene/1-butene copolymer, an ethylene/1-hexene copolymer, an ethylene/1-octene copolymer, or a combination thereof.

14. The ethylene polymer of claim 13, wherein the ethylene polymer contains from about 6 to about 14 LCBs per 1,000,000 total carbon atoms.

15. An olefin polymerization process, the process comprising contacting a catalyst composition with ethylene and an α-olefin comonomer in a polymerization reactor system under polymerization conditions to produce an ethylene polymer, wherein:
the catalyst composition comprises:
catalyst component I comprising a single atom bridged or two atom bridged metallocene compound with two indenyl groups;
catalyst component II comprising a single atom bridged metallocene compound with a fluorenyl group and a cyclopentadienyl group, and with an alkenyl substituent on the single atom bridge and/or on the cyclopentadienyl group;
an activator; and
optionally, a co-catalyst; and
the ethylene polymer is characterized by:
a melt index of less than or equal to about 1 g/10 min;
a density in a range from about 0.94 to about 0.965 g/cm$^3$;
a Mw in a range from about 100,000 to about 250,000 g/mol;
a relaxation time from about 0.5 to about 3 sec; and
an average number of LCBs per 1,000,000 total carbon atoms of the ethylene polymer in a molecular weight range of 300,000 to 900,000 g/mol that is at least 50% greater than that in a molecular weight range of 1,000,000 to 2,000,000 g/mol.

16. The process of claim 15, wherein:
the activator comprises a fluorided solid oxide and/or a sulfated solid oxide;
the catalyst composition comprises an organoaluminum co-catalyst; and
the polymerization reactor system comprises a slurry reactor, a gas-phase reactor, a solution reactor, or a combination thereof.

17. The process of claim 15, wherein the polymerization reactor system comprises a loop slurry reactor, a fluidized bed reactor, a solution reactor, or a combination thereof.

18. The process of claim 17, wherein the activator comprises an aluminoxane compound.

19. The process of claim 17, wherein:
hydrogen is added to the polymerization reactor system; and
the α-olefin comonomer comprises 1-butene, 1-hexene, 1-octene, or a mixture thereof.

20. The process of claim 17, wherein:
catalyst component I comprises a two carbon atom bridged zirconium metallocene compound with two indenyl groups;
the alkenyl substituent is on the cyclopentadienyl group of the single atom bridged metallocene compound; and
the single atom bridge is a carbon atom bridge with two aryl group substituents.

21. The process of claim 17, wherein a weight ratio of catalyst component I to catalyst component II in the catalyst composition is in a range from about 1:5 to about 5:1.

* * * * *